(12) United States Patent  
Hopkins

(10) Patent No.: US 6,282,462 B1
(45) Date of Patent: Aug. 28, 2001

(54) IMAGE ACQUISITION SYSTEM

(75) Inventor: T. Eric Hopkins, Wellesley, MA (US)

(73) Assignee: Metrovideo Inc., Wellesley, MA (US)

( * ) Notice: Subject to any disclaimer, the term of this patent is extended or adjusted under 35 U.S.C. 154(b) by 0 days.

(21) Appl. No.: 08/884,589

(22) Filed: Jun. 27, 1997

Related U.S. Application Data

(60) Provisional application No. 60/038,690, filed on Feb. 7, 1997, and provisional application No. 60/020,885, filed on Jun. 28, 1996.

(51) Int. Cl.$^7$ ..................................................... G05B 15/00
(52) U.S. Cl. ........................ 700/259; 348/323; 348/314; 358/474; 382/153
(58) Field of Search ............................. 382/153; 358/444, 358/474; 348/314, 311, 317–324; 700/259

(56) References Cited

U.S. PATENT DOCUMENTS 5,196,939 * 3/1993 Elabd et al. ........................ 348/314
5,239,387 * 8/1993 Stein et al. ............................ 358/444

FOREIGN PATENT DOCUMENTS

4207474A1 9/1993 (DE) .
0 321 070 6/1989 (EP) .
1432494 10/1988 (SU) .

OTHER PUBLICATIONS

Smith, J.S. et al., "A High–Speed Image Acquisition System for Robotics," *Trans Inst MC*, vol. 14, No. 4, 196–203 (1992).

* cited by examiner

*Primary Examiner*—William Grant
*Assistant Examiner*—Steven R. Garland
(74) *Attorney, Agent, or Firm*—Lahive & Cockfield, LLP

(57) ABSTRACT

An image acquisition system for machine vision systems decouples image acquisition from the transmission of the image to a host processor by using a programmable imager controller to selectively disable and enable the transmission of data to the host and by using a system of buffers to temporarily store image data pending allocation of memory. This enables the image acquisition system to acquire images asynchronously and to change the exposure parameters on a frame-by-frame basis without the latency associated with the allocation of memory for storage of the acquired image. The system architecture of the invention further permits interruption and resumption of image acquisition with minimal likelihood of missing data. Data throughput is further enhanced by transmitting to the host only that data corresponding to the region of interest within the image and discarding the data from outside of the region of interest at the camera stage.

98 Claims, 8 Drawing Sheets

PROGRAMMABLE IMAGER CONTROLLER STATES

| | SIEN | XFREN | VCKEN | VCUSP | HCKEN | STATUS$_x$ |
|---|---|---|---|---|---|---|
| IDLE | 1 | 0 | 0 | 0 | 1 | 0 |
| COMMAND | 1 | 0 | 1 | 0 | 1 | 0 |
| ARMED | 1 | 0 | 1 | 0 | 1 | 1 |
| EXPOSURE | 0 | ⊓ | 0 | 0 | 1 | 0 |
| FAST SHIFT 1 | 1 | 0 | 1 | 1 | 1 | 0 |
| READOUT | 1 | 0 | 1 | 0 | ⊔* | 0 |
| FAST SHIFT 2 | 1 | 0 | 1 | 1 | 1 | 0 |

* LOW PULSE ONCE PER PIXEL

FIG. 6

IMAGE ACQUISITION SYSTEM

This application claims benefit of U.S. Provisional Application No. 60/038,690 filed Feb. 7, 1997 and U.S. Provisional Application 60/020,885 filed Jun. 28, 1996.

BACKGROUND OF THE INVENTION

The present invention relates to image acquisition systems, and more particularly to image acquisition systems suitable for machine vision systems that capture and process optical images.

Conventional image acquisition systems have been used for decades to acquire and process optical images. The conventional systems typically employ one or more video cameras that acquire an image and frame grabber boards that store and/or process the image. These systems are relatively easy to connect since the components of the system are well characterized, readily understood, and result in predictable performance.

Today's modem manufacturing and industrial installations are becoming increasingly automated to increase quality and reduce costs to better compete in the global market. Consequently, these installations typically employ machine vision systems which are used to monitor production processes, position selected components, and to perform other important manufacturing tasks. There is, however, a mismatch between the requirements of modem machine vision systems and the design goals of existing imaging technology typically used with machine vision systems.

Conventional image acquisition systems are designed to provide either a continuous flow of images or a predictable flow of images at a fixed rate determined by human awareness and response times, and at the lowest possible cost. With a new frame being transmitted every 1/60 second, missing lines and/or frames in such a system are tolerable because they are generally unnoticed by a human viewer. The fixed rate of image capture and delivery in conventional image acquisition systems is just fast enough to seem infinitely fast or seamless to human perception. Because errors that occur during image acquisition and transfer, such as dropped lines and frames, are only presented to a viewer for 1/60th of a second, and because the human eye acts as a time integrator, these intermittent errors are rarely perceptible to a human observer.

On the other hand, machine vision systems often make decisions based on a single still image. Because of this, machine vision systems require considerably higher resolution, contrast, and tolerance for data integrity than conventional image acquisition systems. For example, if the machine vision system is looking for normal process variations in manufactured parts, any imaging errors can result in the inappropriate rejection of a part. This leads to unnecessary part waste and an increase in the total costs of production.

Errors in an image acquisition system include imaging errors and processing errors. Processing errors, such as dropped lines and frames, arise from errors that occur as image data travels from the camera to the host computing system. Imaging errors arise in the camera itself or in the environment outside the camera. The former we refer to as sensor errors and the latter we refer to as scene errors.

Sensor errors typically arise from differences between photosensitive elements, (e.g., photosites in a charge-coupled device) that form part of the image acquisition system. As a result of these differences, a pair of photosensitive elements may respond differently to the same level of illumination. These differences arise from normal process variations in the manufacture of the photosensitive elements or from temperature differences between otherwise identical photosensitive elements.

Scene errors are those errors that arise from incorrectly illuminating a scene. Since ambient lighting conditions cannot be controlled to the same level of precision as that resolvable by a modem machine vision system, subtle variations in lighting levels or colors, due, for example, to aging of light sources, can degrade the performance of the machine vision system.

Unlike conventional image acquisition systems which obtain images either continuously or at regular intervals, machine vision systems can require images at unpredictable times. For example, in an automated inspection line, the objects to be inspected may not be spaced apart regularly enough on the conveyor belt to permit periodic image acquisition. Consequently, a machine vision system does not have the luxury of knowing, in advance, when an image is to be received.

A machine vision system should also be ready to acquire an image almost immediately upon request. For example, in the automated inspection line described above, if an object to be inspected is about to enter the camera's field of view, it is preferable that an image be acquired rapidly, before the object leaves the camera's field of view.

Because machine vision systems often have to obtain multiple images in rapid succession, a need exists to rapidly transmit image data to a processor of a host system. Prior art machine vision systems generally interrupt the host processor to obtain a starting memory address in which to place an image or portion thereof before the actual image acquisition and transfer can begin. In such systems, referred to as "software scatter/gather" systems, the host processor plays a significant role in image acquisition and transfer. This reliance on a scarce resource such as the host processor results in latency periods during which image acquisition and transfer cannot occur because the host processor is busy performing other tasks. These latency periods of uncertain duration make it difficult, if not impossible, for a machine vision system to repeatedly acquire an image on demand. When the latency period becomes excessively long, collisions can occur in the data path as data from subsequent images arrives faster than data from previous images can be processed. This results in lost or erroneous data.

In other machine vision systems, referred to as "hardware scatter/gather" systems, data transfer is performed by a direct memory address technique (DMA). Although these systems do not require the assistance of the host processor to access memory, they typically require that a memory segment be dedicated to their use. The disadvantage of this method is that the dedicated memory becomes unavailable for use by other processing tasks, even when it is not being used for image transfer.

In systems of this type, data collisions, as described above, can be ameliorated by dividing the dedicated memory into two blocks. This enables the system to place an incoming image into the first memory block while processing the image in the second memory block. Once the system finishes processing the image in the second block, it can begin processing the image in the first block, thereby freeing the second block to receive another incoming image. A disadvantage of this system type is that, when used in conjunction with a multithreaded computing environment, the complexity of programming this task becomes rapidly unmanageable.

It is also desirable for modem machine vision systems to autonomously determine whether or not an image should be acquired. For example, in an inspection line, the objects to be inspected may not be spaced at regular intervals. This raises the problem of how to acquire an image only when an object to be inspected is in the camera's field of view or in a particular region within the camera's field of view.

Prior art systems attempt to solve this problem by triggering the camera with an external sensor located outside of the machine vision system. These sensors, however, are typically difficult to interface reliably with the machine vision system. Moreover, latency associated with the machine vision system can make it difficult to reliably position the object to be inspected in the correct region of the camera's field of view.

Further important constraints imposed by conventional image acquisition systems include the relatively fixed field of view, relatively fixed frequency of image capture, fixed and relatively low rate of image transfer to host computer memory (or relatively expensive transfer of image), and lack of data integrity, arising, for example, from gray scale errors due to several causes including pixel jitter and skew, or from lost data such as dropped lines and frames.

Additionally, current machine vision systems are relatively expensive to install and operate. Another drawback of these systems is that they are unable to change the form of the acquired image data in real time, in other words, between each acquired frame or shot.

Modem machine vision systems have been developed to address some of these drawbacks. One example devised to ameliorate some of these drawbacks includes the use of expensive custom application-specific circuitry to provide high fidelity and low error image acquisition. These custom systems are typically very expensive to acquire and very difficult to integrate with existing machine vision systems.

There thus exists a need in the art for an image acquisition system suitable for use with modem machine vision systems that is flexible and provides for high fidelity asynchronous image acquisition and transfer.

SUMMARY OF THE INVENTION

The image acquisition system of the present invention eliminates these and other sources of image acquisition errors by integrating most of the image acquisition components into one dedicated machine architecture. This dedicated architecture can be utilized to perform preliminary image processing operations in real-time such as correcting each acquired image for both hardware errors and scene errors, recalibrating the sensor array in real time to correct for errors due to differences between pixels or errors in scene illumination, or otherwise spatially filtering the image in real-time, all without burdening the host processor.

A system according to the invention includes an image acquisition stage for acquiring at least a region of interest from an image in response to a trigger signal. The trigger signal can incorporate exposure information for the image acquisition stage and instructions for specifying the region of interest. This information can be changed on a frame-by-frame basis, in real time and on the fly.

The system then transfers either all or part of the data representing the image to the host processor by way of a sequence of temporary buffers. These buffers enable the system to decouple the process of image acquisition from image transfer, thereby enabling the system to acquire images without having to wait for the host processor to allocate memory for storage of the system. The sequence of temporary buffers also enables a system according to the invention to interrupt the process of transmission either between images or in the middle of the image and to resume transmission with little likelihood of data loss.

The data throughput for a system according to the invention is controlled by means of a programmable imager controller which can drive the transfer of data from a CCD array or other solid state imaging device to the host processor at variable rates in response to the state of the buffers and in response to instructions from the host processor. This programmable imager controller further increases system throughput by transmitting to the host processor only data from within the region of interest and discarding data from outside the region of interest. Since data can be discarded more quickly that it can be transmitted, this increase in throughput can be substantial when the region of interest is much smaller than the overall image.

The system of the invention can also control selected system parameters during the acquisition of one or more images. These parameters include the time and duration of exposure, the particular region of interest within the field of view, the particular mode of operation of the system, and other parameters that define the framework for image acquisition and which would be obvious in light of this disclosure to one of ordinary skill in optical and electrical engineering. A significant advantage of the present invention is that these parameters can be changed in real time, between shots or frames, without sacrificing bandwidth. This feature allows the system to dynamically respond to requests during the image acquisition process.

The system also enables images to be acquired asynchronously and virtually on demand without the need to wait for the availability of system memory to store the image. The system achieves this by separating the acquisition of an image by the camera, a task of short and relatively predictable duration, from the task of transmitting the image from the camera to the host processor, a task having an unpredictable and potentially long duration. Consequently, the image capturing stage can be performed independently of the image transfer stage. When necessary, the acquired image can be stored temporarily in memory, such as in a data FIFO register, while the system waits for a memory address to place the image into. Because of this separation between image acquisition and image transfer, the system of the invention can acquire an image without the need to await a memory address in which to place the image. The system is thus not hampered by the latency associated with conventional image acquisition systems. Additionally, the system can thus process requests for an image without requiring the destination address in advance.

When the data FIFO register approaches its capacity, it can assert an interrupt to halt image acquisition as described below. This is achieved by interposing a feedback loop between a camera and the image acquisition board. This feedback loop enables the acquisition board to temporarily and immediately halt image acquisition and transfer whenever there is too much data traffic to permit the reliable transmission of data. According to one practice of the invention, data already acquired by the camera is temporarily stored in the camera throughout the duration of the interruption. By incorporating this function into the dedicated architecture, the present invention relieves the host processor from burdensome data management tasks. This provides for an increase in image fidelity (data integrity) with a corresponding decrease in the occurrence of errors when acquiring images as well as an increase in overall image throughput.

An additional feature of the present invention is that interruption of image acquisition and transfer, as described above, can occur either at the end of a frame, at the end of a line within an image, or at the end of any preselected section of an image. The flexibility achieved by permitting the transfer of image data in units smaller than the entire image enables the system to take advantage of small gaps in data traffic that it would otherwise be unable to use, as well as enables the system to rapidly acquire and transfer image data.

Another feature of the invention is that the system acquires data significantly faster than prior art systems, including hybrid conventional systems employing conventional imaging and machine vision systems. According to one practice of the invention, images can be acquired and transferred to the system's image signal processor up to 30 times faster than conventional systems, while providing for flexible, high speed control and transfer of the image data.

Unlike prior art systems in which a portion of memory is dedicated to hold the image to be processed, the system of the present invention exploits modern operating systems' ability to perform dynamic memory allocation. This permits the system to allocate only as much memory as is necessary to process an image and to allocate that memory only when it is necessary to do so and on an image-by-image basis. Once the image processing task has been completed, memory allocated to that task can be released for use in other processing tasks.

According to one aspect, the system acquires images asynchronously and independently of the host processor.

This is facilitated by the separation of image acquisition and transfer, thereby permitting acquisition to occur before memory to store the image is made available. The system is also configured to place a time-stamp on the acquired image. According to one practice, controller hardware of the host device monitors the system for a camera trigger signal, which triggers the camera. This avoids the latency associated with having the host processor monitor and time stamp the image.

The present invention also provides a structure for autonomously deciding, based on an image in the camera's field of view, whether or not to acquire an image. The system of the invention accomplishes this by designating a trigger region within the camera's field of view and processing the image from the trigger region to determine if the image in a region of interest within the camera's view should be acquired. The system processes the portion of the image within the designated trigger region independently of the host processor and at relatively high sample rates.

The foregoing control of the image acquisition process is thus controlled on an image-by-image basis in a dedicated architecture that is smaller and significantly less costly than systems heretofore known, thus dramatically reducing the overall cost of the image acquisition system. Additional features of the invention which aid in the reduction of cost include the simplification of the data paths.

The image acquisition system of the present invention includes an image acquisition element, such as a camera, for acquiring an image and a programmable control element which selectively and programmably initiates the performance of a number of selected functions by the image acquisition element. These functions can include the initiation and termination of image acquisition, the selection of a particular region of interest within the acquired image, calibration or filtering of the outputs of the photosensitive elements that form part of the image acquisition system, definition of a trigger region, or the purging of charge from the photosensitive elements. The image acquisition by the camera can also be interrupted, in real-time, such that at least a portion of the image is temporarily stored in the camera. This interruption sequence allows the image acquisition system of the invention to process any previously transferred image data in highly reliable manner.

The system can be mounted on an acquisition board that functions as an interface between the camera and a conventional host computing system. The acquisition board manages the transfer of image data between the camera and the host computing system, where the image data is ultimately processed.

BRIEF DESCRIPTION OF THE DRAWINGS

The foregoing and other objects, features and advantages of the invention will be apparent from the following description and the accompanying drawings in which like reference characters refer to the same parts throughout the different views.

FIG. 6 is tabular depiction of the states of selected gates of the programmable imager controller of FIG. 5 during selected modes of operation.

DESCRIPTION OF ILLUSTRATED EMBODIMENTS

Figure 1:
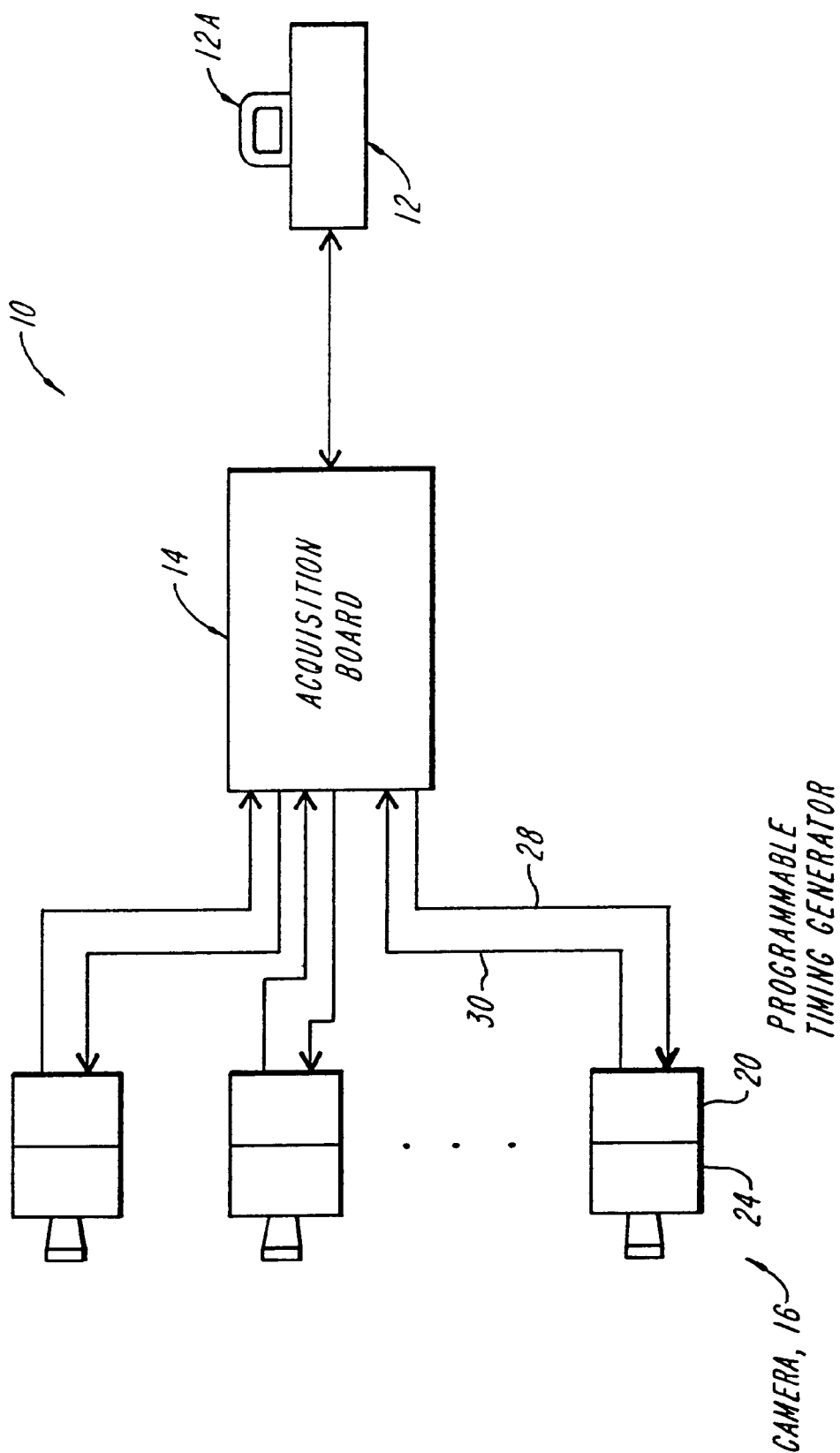
FIG. 1 is a schematic block diagram of the image acquisition system of the present invention.

FIG. 1 is a schematic illustration of the image acquisition system 10 according to the teachings of the present invention. The illustrated system 10 includes a central or host computing system 12. The host computing system can be any conventional computing apparatus and can comprise a display monitor and a dedicated signal processor or can be a client signal processor which forms part of a larger area network, such as a LAN or WAN. The host computing system 12 is preferably in communication with an acquisition board 14, which in turn is coupled to one or more external image capturing devices 16. e.g., cameras. The acquisition board 14, although illustrated as being located outside of the host system 12, can form part of that system as will be appreciated by those of ordinary skill. Consequently, occasionally the combination of the two will be referred to as the host system. According to a preferred practice, the acquisition board is similar to a PCI bus card which interfaces with the PCI bus of the host system 12, according to the teachings of the present invention.

Those of ordinary skill will recognize that a single acquisition board 14 can be used to operate a number of cameras 16. Conversely, a separate acquisition board 14 can also be used for each camera 16 of the acquisition.

The illustrated cameras 16 each include a programmable imager controller stage 20 which is coupled to an image capturing element 24. The acquisition board 14 preferably generates control signals which are transferred to the programmable imager controller 20 along communication path 28. The output of the camera element 16 is transferred to the acquisition board along data output path 30 for storage and/or processing by the host system 12.

Figure 2:
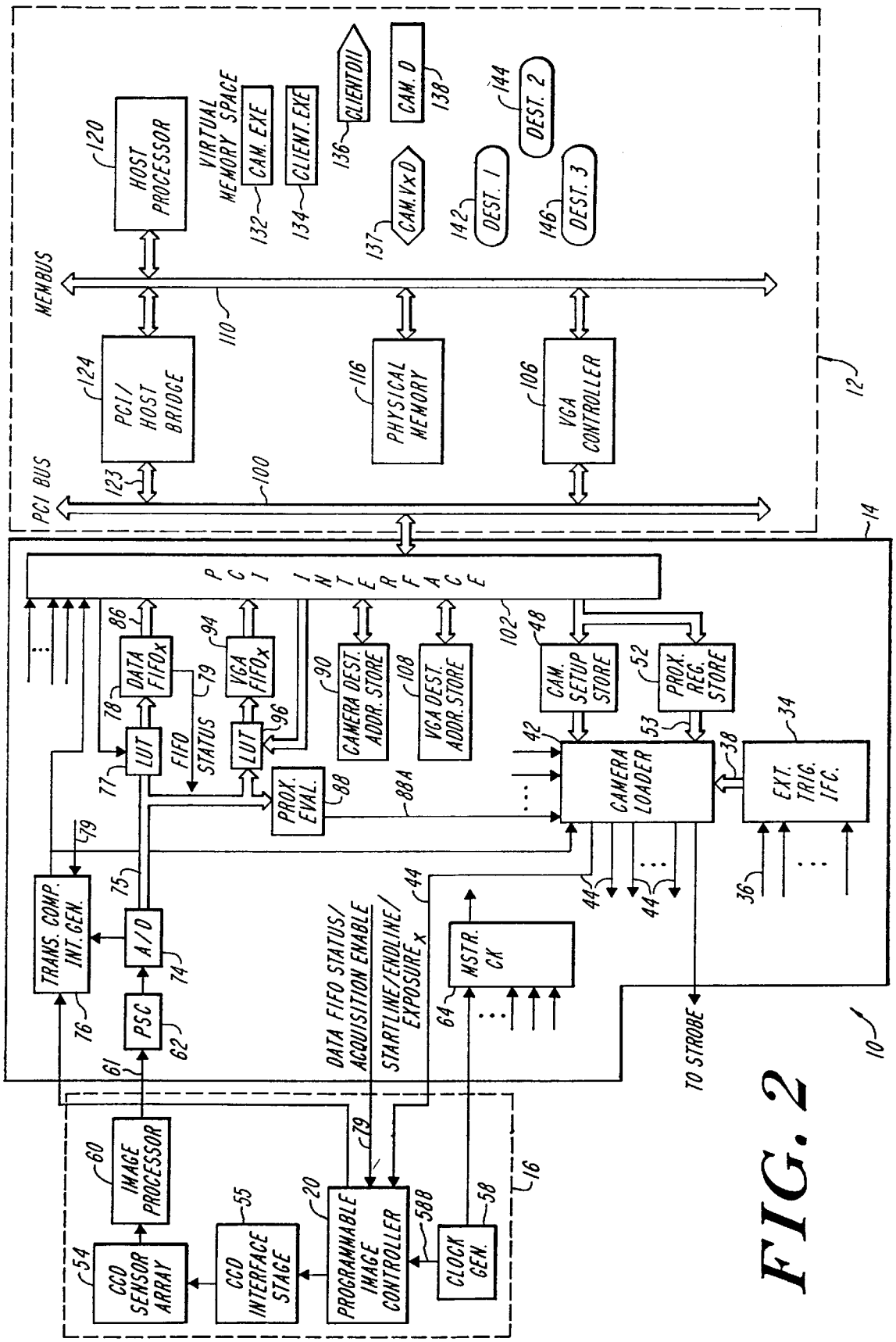
FIG. 2 is a more detailed schematic block diagram of the image acquisition system of FIG. 1.

FIG. 2 is a more detailed schematic depiction of the image capturing element 16, acquisition board 14 and host computing system 12 of the present invention. The illustrated host computing system 12 preferably includes a bus 100, a display controller 106, a memory bus 110, a memory module 116 representing actual physical memory, a host processor 120, a co-processor 124, and a virtual memory block 128 that illustratively stores selected executable and dynamic link libraries and code, designated as code modules 132–138, as well as selected memory for the image data regions, designated as destination addresses 142–146. Those of ordinary skill in computer and electrical engineering will readily understand the operational relationship between the memory, both physical and virtual, and the software resident on the host computing system 12.

The bus 100 preferably interfaces and communicates with the acquisition board 14 and provides structure that allows for the flow of image data between the camera 16 and the host computing system 12. The term "bus" is intended to include any suitable data signal transmission path, and is preferably a high bandwidth data transmission channel, such as a PCI bus. The display controller 106 preferably communicates with both the bus 100 and the memory bus 110 to allow the controller 106 to display the acquired image data on the display monitor 12A, such as a VGA monitor, and to access stored instructions. The illustrated co-processor 124 is preferably coupled to both the bus 100 and the memory bus 110 and serves to direct the acquired image data. The use of this IO controller, i.e. "bridge chips" reduces the need to interrupt the host processor 120 to process the image data, and thus decreases the overall processing time and increases the processing rate of the image acquisition system 10.

The image acquisition system 10 can operate, according to one practice, in response to externally applied triggers or in response to signals generated internally by selected software code stored in the memory 128 of the central system 12. Specifically, selected imaging modes of operation can be rapidly chosen by initiating a request to the system 10. The term "rapidly" is intended to mean initiating the request in less than or equal to about 32 ms, and, preferably in less than or equal to about 1 ms. For example, a request can be made by the camera interface executable program, referred to as cam.exe 132, or by selected client software (for example an image analysis or machine vision application program), referred to herein as client.exe 134. The executable file 134 thus uses the image acquisition system 10 as a source of image data.

The terminology used herein is appropriate for systems installed in computers employing Microsoft's Windows 3.11 and DOS v. 6.x operating systems. When used with other operating systems, for example Windows NT or VME systems, similar terminology will apply. The structure of the software code designated by cam.exe, client.exe, and the dynamic link libraries can be easily constructed by the ordinarily skilled computer and electrical engineer by reference to the description of the operation of the image acquisition system 10 of this specification.

According to one practice, when the host computer loads or boots the executable program cam.exe 132, a selected environment is established in the host computer that the camera system employs to service requests from either a user, through the computer's keyboard and mouse, or from an autonomous executable code block, such as the machine vision program client.exe 134. At a minimum, the program incorporating an interrupt code (interrupt service routine) is loaded into the memory 128 of the host computing system 12. The role of the interrupt code is to rapidly notify either cam.exe 132 or client.exe 134 that an image buffer has been filled with the data it requested and is ready for viewing and/or processing by the requester. If the program cam.exe 132 needs to respond directly to user requests, it calls selected dynamic link libraries (DLL's). These DLLs, such as can.dll, are typically used to store instantaneously accessible lists of functions and resources or to allocate virtual and physical memory for image buffers located in the host computing system 12. Alternatively, when the program client.exe 134 issues requests for an image directly, it allocates sufficient buffer space in memory by making direct calls to cam.dll 138.

Camera Setup

In all modes of operation, either cam.exe 132 or client.exe 134 establishes the operating framework for the image acquisition system 10 by providing selected camera setup information, including the particular mode of camera operation, the particular region of interest, and proper exposure times, and by providing host memory setup requirements, including image buffers to receive, hold and process the image data for one or more cameras 16. These programs can thus be used to generate the camera instructions stored in the camera setup store 48 and reserved physical addresses for image data in the destination address store 90, as discussed further below.

As used herein the term "region of interest" is intended to include a region or portion of an acquired image that is smaller in one or more spatial or axial dimensions than the entire image acquired by the image acquiring device or system. The region of interest is preferably selectable. Additionally, those of ordinary skill will recognize that the programs can establish multiple and different regions of interest which are loaded into the camera setup store 48 and the destination address store 90, as described in further detail below. These multiple regions of interest allow the system to dynamically acquire an image and process different selected portions of the entire acquired image. Additionally, these multiple regions of interest allow the system to trigger acquisition of an image from one region of interest based on the content found in another region of interest.

According to one preferred practice, the region of interest can be specified by providing the line and pixel number of the upper left corner of a rectangular region in the image and similar information for the lower right hand corner of the region. The filled image buffers established by the host operating system can be areas of contiguous virtual memory that are reserved and mapped to physical regiments in selected and variable block sizes, e.g., 512 byte to 4K byte blocks, and that have a defined initial physical memory address, denoted as memory locations 142–146. Those of ordinary skill will appreciate that image buffers contiguous in virtual memory space may be realized by non-contiguous locations in physical memory space. It is anticipated by the teachings of the present invention that only within each physical block are physical addresses contiguous. This facilitates the asynchronous mixing of data into one DMA channel from multiple sources during multiple camera acquisitions.

All of the foregoing information is communicated to the camera 16, to the acquisition board 14 and to the host computing system 12 in the form of a call, in a language specified for and compatible with the image acquisition system, to a selected code module, for example, cam.dll 138. The selected code module responds by making API or similar calls to the operating system of the host computing system 12 to allocate one or more regions of contiguous virtual memory, typically in sizes ranging between 1–300K byte and larger. Each such region of contiguous virtual memory is divided into subsets, typically 1–4K byte blocks, that can be a size convenient for the operating system. The operating system is then queried for the physical address of the first byte in each of these subsets. The foregoing physical addresses are communicated, via API (application programming interface) or similar calls, to the camera destination address store 90. In a DOS/Windows/PCI environment, each subset is itself contiguous in physical memory. The program cam.dll 138 transfers this information into on-board memory, which directly controls the cameras and which can reside in, among other locations, an input-output bus 102 (typically a PCI bus). The beginning addresses of the image buffer physical memory block for each image buffer are then stored in a selected memory location, designated as the camera destination address store 90. Meanwhile, the exposure times, camera modes, and regions of interest are also loaded into the camera setup store 48.

Image data is transferred to the foregoing memory allocated for image buffers via direct memory address (DMA) transfers that typically do not require processing by the host processor 120. Hence, the host processor 120 need only be interrupted upon completion of an image transfer. Those of ordinary skill in computer and electrical engineering will appreciate the type of code that can be employed to perform the foregoing and following actions.

At the same time that it is transferred to host physical memory, image data can also be directed, via DMA transfer, to a display controller 106. A look up table (LUT) 96 converts pixel data in real time into a form appropriate for the host computing system 12 and its display controller 106.

Initiating Image Acquisition

With further reference to FIG. 2, the acquisition board 14 includes an external trigger interface 34 having a plurality of external trigger inputs 36 to accept signals generated by a variety of external sources, including the host system 12. Upon receiving an appropriate signal through the trigger input 36, the external trigger interface 34 generates trigger output signal 38 instructing the camera loader 42 which camera or array of cameras to use.

The illustrated camera loader 42 has multiple inputs, e.g., supports n inputs, and generates one or more camera trigger signals 44 that drive one or more cameras 16 designated by the particular input signal. The camera trigger signal 44 preferably includes selected camera setup information, including but not limited to the startline and endline of the region of interest (ROI), exposure time of the image to be acquired, and mode of operation. The particular mode of operation of the illustrated system 16 designates the operational sequence and parameters of the camera 16. Representative modes of operation are described in greater detail below. This camera setup information is typically communicated between the host processor 120 and acquisition board 14 by the PCI bus 100. The camera loader 42 further communicates with selected memory blocks, illustrated as camera setup storage block 48 and proximate register storage block 52, the functions of which are described in further detail below.

The host processor 120 initializes the image acquisition system 10 by storing selected setup information. This set up information includes mode of camera operation, regions of interest within the image, and exposure times. The host processor 120 further provides additional setup requirements for the camera 16. These include image buffers that a particular client uses to receive, hold and process image data. The host processor can select a particular region of interest within the image captured by a camera 16 by specifying the line and pixel number of the upper left corner of the rectangular region of interest, and by specifying similar information concerning the lower right-hand corner of the region of interest. The host computing system thus defines, according to simple calls, the region of interest for a selected frame. This selected region of interest can remain constant or can be changed either after each frame or after a selected number of frames.

Image Acquisition

Referring again to FIG. 2, the camera trigger signal 44 generated by the camera loader 42 for a particular camera 16 is loaded into the programmable imager controller 20 of that camera 16. The camera trigger signal 44 can be transmitted to the camera at any time and without the need to have a destination address already allocated for the image to be acquired. If the image is acquired before a destination address can be made available, the image data can simply wait at one or more locations on the data path, such as in a data FIFO 94, until a destination address becomes available, as described below.

According to the illustrated embodiment, the camera trigger signal 44 for a selected camera 16 is generated by the camera loader 42 in response to the instructions stored in the camera setup store 48 for that camera and in response to the output signal 53 of the proximity register store 52. Specifically, the camera loader 42 accesses the instructions stored in the camera setup store 48 for the selected camera 16 and shifts the appropriate bits to the camera. The camera trigger signal 44 is preferably a signal that includes: w bits designating the exposure time, x bits designating the first line of the region of interest, y bits designating the number of lines in the region of interest, and z bits designating the camera mode for this shot. The numbers w, x, y and z depend on the CCD array circuit 54 of the camera 16.

The camera trigger signal 44 can be different for each image acquisition. As a result, it is possible to change the contents of the camera setup store 48 at each frame. This enables the machine vision system to change exposure time, region of interest, or camera mode between frames. Because image acquisition can proceed independently of image transfer, a change in the contents of the camera setup store 48 has no appreciable impact on system performance.

The processes of image acquisition and memory allocation for the image can be performed in parallel with and substantially independently of each other. This enables the system's memory manager to generate destination addresses as system requirements dictate. Among the advantages of this feature are that it enables the system: to acquire an image almost immediately after a request for an image is issued and without the often unpredictable latency associated with waiting for a destination address; to queue several image acquisition requests; and to perform time-consuming image processing tasks, for example writing it to a disk, independently of image acquisition and transfer. Hence, image acquisition can be initiated without regard to the allocation of a destination address, which is eventually stored in memory 90.

In one instance, the programmable imager controller 20 preferably includes a programmable logic device such as a field programmable logic array circuit (FPLA) and a voltage converter for transforming selected signals into a form compatible with the remaining camera components. Those of ordinary skill in electrical engineering and circuit design will understand that the FPLA is an ASIC chip that can be designed to operate in a manner in accordance with the teachings of the present invention.

The illustrated programmable imager controller 20 is programmable in that the receipt of a different camera trigger signal 44 at any selected time, e.g., after each frame exposure or after any selected number of frame exposures, initiates a different image capturing scheme. For example, the camera 16 can be instructed, via the programmable imager controller 20, to transmit a different region of interest after each frame. This provides for a relatively simple method of dynamically controlling the region of interest and exposure without requiring the use of complex image capturing and processing circuitry. Furthermore, this programming is performed relatively rapidly. For example, in less than about 12 $\mu$s and preferably less than about 1 $\mu$s, the programmable imager controller 20 can generate a new set of instructions to the CCD array circuit 54.

According to a preferred practice, the arrival of the last bit in the programmable imager controller 20 arms the camera 16, subsequently, the camera loader 42 generates a camera trigger signal 21 that is transferred to the image capturing portion of the camera 16, which includes a CCD array circuit 54, an image processor 60, and an oscillator 58 local to the camera. The illustrated camera oscillator 58 preferably transmits a camera timing signal 58B to the programmable imager controller 20 and to the acquisition board 14. This camera timing signal 58B synchronizes the acquisition board 14 with the camera 16 and with the host computing system 12. Those of ordinary skill in computer and electrical engineering will recognize that the camera trigger signals can be loaded in other ways.

Once the programmable imager controller 20 receives the camera trigger signal 21, the CCD array circuit 54 initiates the exposure process according to the teachings of the present invention. This exposure process preferably lasts for a selected exposure period, as defined by the selected exposure bits which comprise part of the camera trigger signal 44 generated by the camera loader 42.

The system 10 runs kernel level software which is responsive to the presence of the camera trigger signal 21 or a trigger signal on the external trigger inputs 36. Upon the occurrence of either of these signals, the kernel level software requests the system time from the host processor 120. This request is set to have priority sufficiently high to ensure negligible latency in the response of the host processor 120. The system time is then made available for associating with the image data acquired in response to the trigger signal.

Transmitting the Acquired Image Out of a CCD Array

The programmable imager controller 20 receives a camera trigger signal 21 representative of selected image capturing parameters. This signal is received by the CCD array circuit 54. The receipt of this trigger signal initiates a sequence of signals for the control of a solid state imager such as a CCD array. The mechanism used by the CCD array to deliver an image does not affect the operation of the invention. The illustrated CCD array circuit 54 in the preferred embodiment is an interline transfer CCD which includes a CCD sensor array having a number of photosites corresponding to a selected number of pixel locations and a progressive scan chip that provides for the shifting of acquired optical data into a vertical array of registers. For example, if the camera is designed for 640×480 resolution, then there exists a photosite array of 640 columns and 480 rows of photosites, i.e. a photosite behind each pixel. Those of ordinary skill will appreciate that the CCD array functions as an integrator of light over time, and need not be described in further detail herein.

Figure 3A:
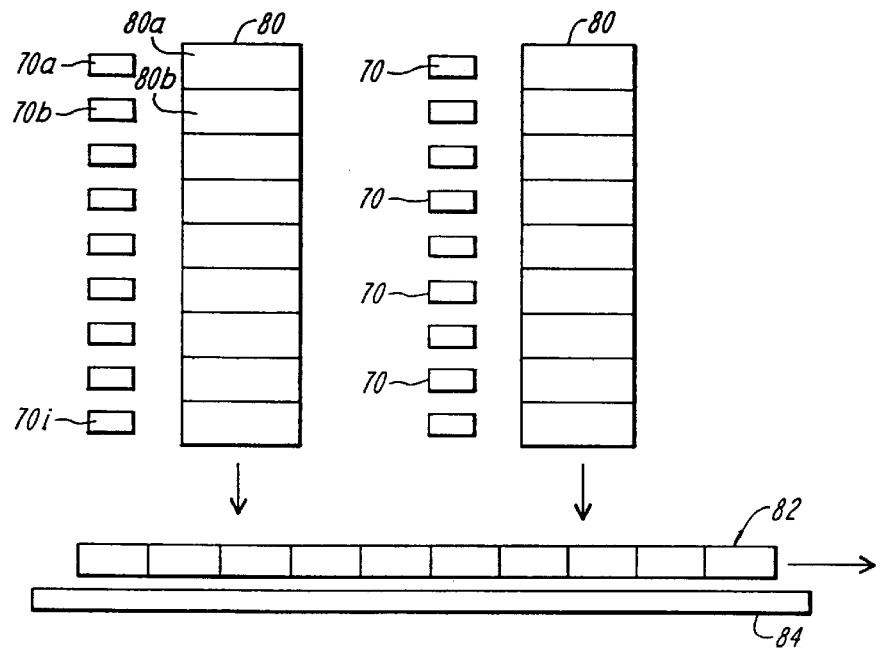
FIGS. 3a–3b are schematic depiction's of the vertical and horizontal register arrays of the camera component of the acquisition system of FIG. 1.

Referring to FIG. 3A, in an interline transfer CCD each photosite 70 accumulates charge corresponding to that portion of the image to which it is exposed. At the expiration of the exposure time and in response to the imager controller 20, each photosite 70 transfers its stored charge to a shadow register 80a in a vertical array of registers 80 associated with the column of photosites. This transfer occurs simultaneously for all photosites in the array. Although FIG. 3A shows only two columns of photosites and two vertical arrays of registers, those of ordinary skill will appreciate that for a 640×480 resolution there can exist 640 vertical registers.

Figure 3B:
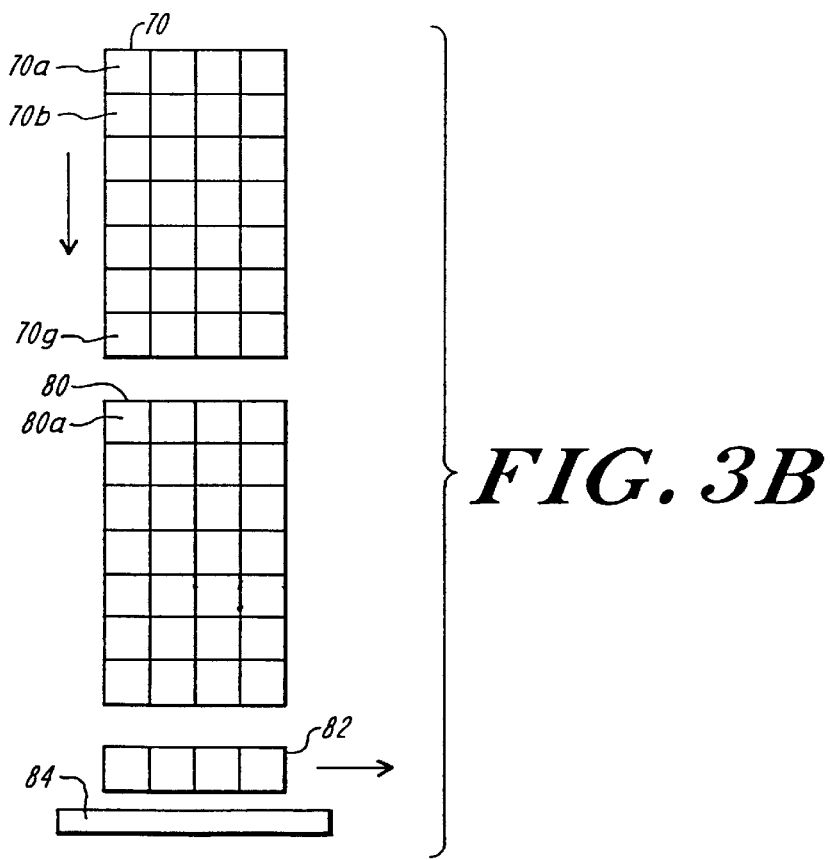

Referring to FIG. 3B, in a frame transfer CCD, each photosite 70a accumulates charge corresponding to that portion of the image to which it is exposed. At the expiration of the exposure time and in response to the imaging controller 20, each photosite 70a transfers its stored charge to an adjacent photosite 70b. The photosite at the edge of the CCD array 70g transfers its charge to the topmost register 80a in the vertical array of registers 80. This procedure is repeated until the contents of the topmost photosite 70a in a column of photosites 70 has been shifted into the topmost register 80a in the vertical array of registers 80.

It is apparent that the net result in both the flame transfer CCD of FIG. 3B and the interline transfer CCD of FIG. 3A is identical, namely a vertical array of registers 80 in which each register contains a charge corresponding to the charge held by a corresponding photosite.

The CCD array circuit 54 can further include a horizontal array of registers 82 having as many registers as there are vertical arrays of registers. Hence, for 640×480 resolution as in the example above, the horizontal array of registers 82 would include 640 registers. The registers comprising the horizontal array of registers preferably communicate with the illustrated substrate surface 84. Although only one horizontal array of registers is illustrated in the drawing, those of ordinary skill will appreciate that a number of horizontal arrays of registers can be used.

With further reference to FIGS. 3A and 3B, once the image has been acquired by the camera and the charge associated with that image has been transferred to the vertical arrays of registers, the programmable imager controller 20 begins shifting the image data stored within the vertical arrays of registers 80 into the vertical array of registers 82. For a 640×480 image, the horizontal array of registers be horizontally shifted 640 times before the image transfer is completed.

In a conventional machine vision system acquiring an m×n image, at the end of each of the m shifts, the system 10 cannot decide whether the current line of registers corresponds to a line of the image within the region of interest. As a result, all the contents of all the registers are transmitted to the acquisition board for further processing, regardless of whether or not the contents of the registers correspond to a line above or below the region of interest. Typically, it takes 50 to 100 times longer to discard the contents of the n registers than it does to shift a row from the n vertical arrays of registers into the n registers in the horizontal array of registers. As a result, in conventional systems, the rate at which an image can be transferred is limited by the rate at which the horizontal array of registers can be operated. Because of this, conventional systems fail to exploit the speed with which multiple lines of an image can be shifted into the horizontal array of registers.

In the system 10 of the present invention, at the end of each of the m shifts, the system can decide whether the contents of the n registers correspond to a line of the image within the region of interest. If they do, the contents of the n registers are transmitted to the acquisition board for further processing just as they were in the conventional system. However, if the contents of the n registers do not correspond to a line of the image within the region of interest, the n registers are quickly overwritten by the next row of n registers from the n vertical arrays of registers. Any excess charge either simply "spills" into the substrate 84 with which, as set forth above, the registers are in communication or is removed in one shift through the horizontal register. As a result, the horizontal array of registers only has to perform the slow process of transferring data to the acquisition board when a line from the region of interest has actually been loaded into it. In this way, the present invention is able to exploit the speed with which charge from the contents of the vertical array of registers can be transferred to the horizontal array of registers.

The vertical array of registers 80 is shifted until the line of information located immediately before the first line of the region of interest, as defined by the control bits generated by the camera loader 42, is placed in the horizontal register 82. The next line is then shifted vertically down, and then clocked horizontally out of the horizontal register, to remove all charge therefrom.

The camera trigger signal 44 also includes the ending line of the region of interest. Thus, the image data associated with each line of the region of interest is clocked into the horizontal register 82 and then read out. This information is then transmitted to the image processor 60, as denoted by CCD array output signal 59 and as illustrated in FIG. 2. The image processor 60 conditions the CCD array output signal 59 prior to transfer to the acquisition board 14. The image processor 60 is well characterized and known in the art and need not be described further herein.

The remaining image data, if any, associated with the portion of the image outside the region of interest is then shifted out of the horizontal and vertical arrays of registers 80, 82, and discarded. This is done by rapidly shifting the data from the array of vertical registers 80 into the array of horizontal registers 82.

In addition to the method of fast vertical shifting through lines outside the region of interest, further acceleration is achieved by trading vertical resolution for speed within the region of interest. The mode word z above includes the number of adjacent lines to be combined before each reading of the horizontal register during transfer of data within the region of interest. By this method two or more vertically adjacent pixels are added together in the horizontal register and read out as one data value.

Operation of the Programmable Imager Controller

Figure 4:
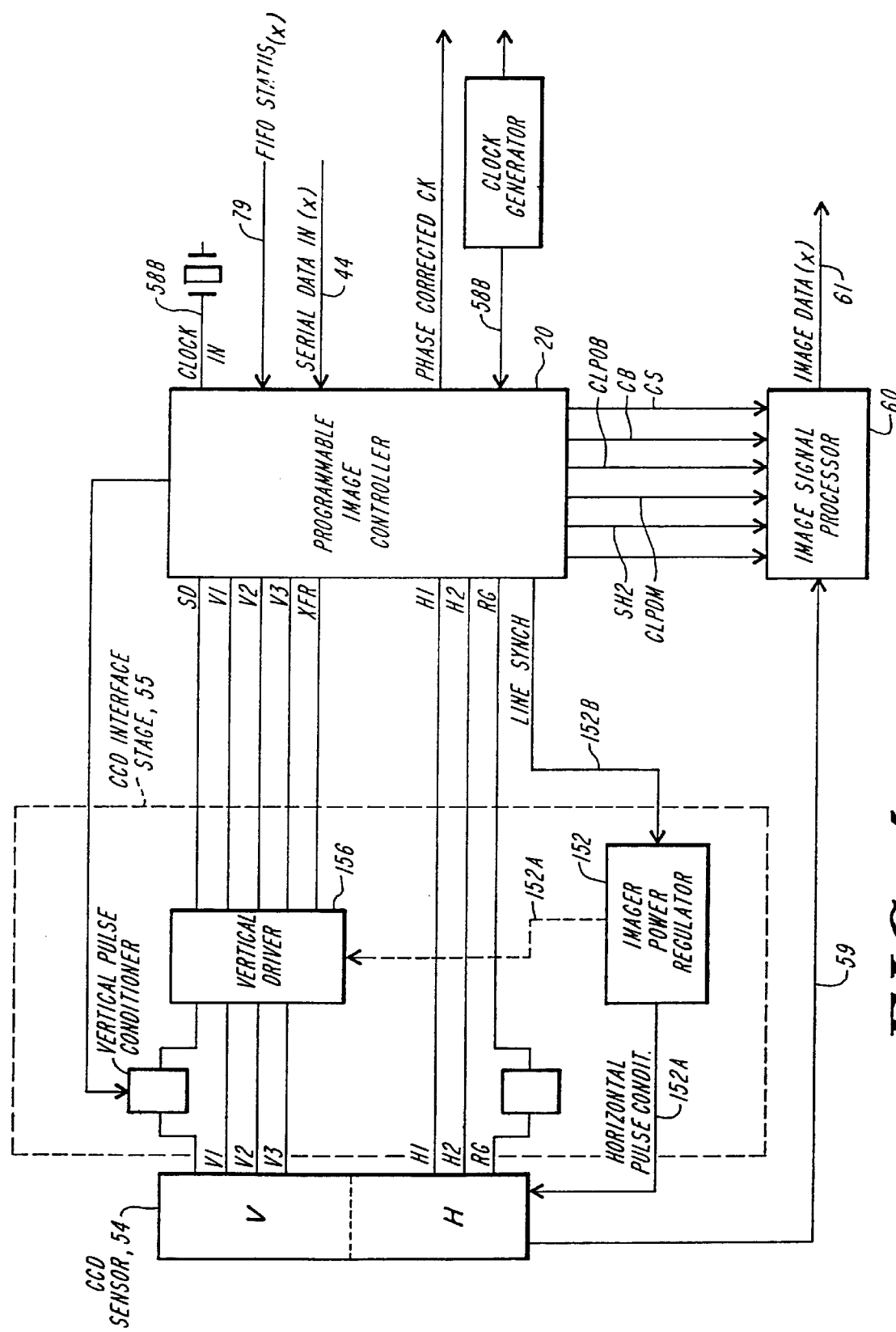
FIG. 4 is a more detailed schematic depiction of the image acquisition device of FIG. 1.
Figure 5:
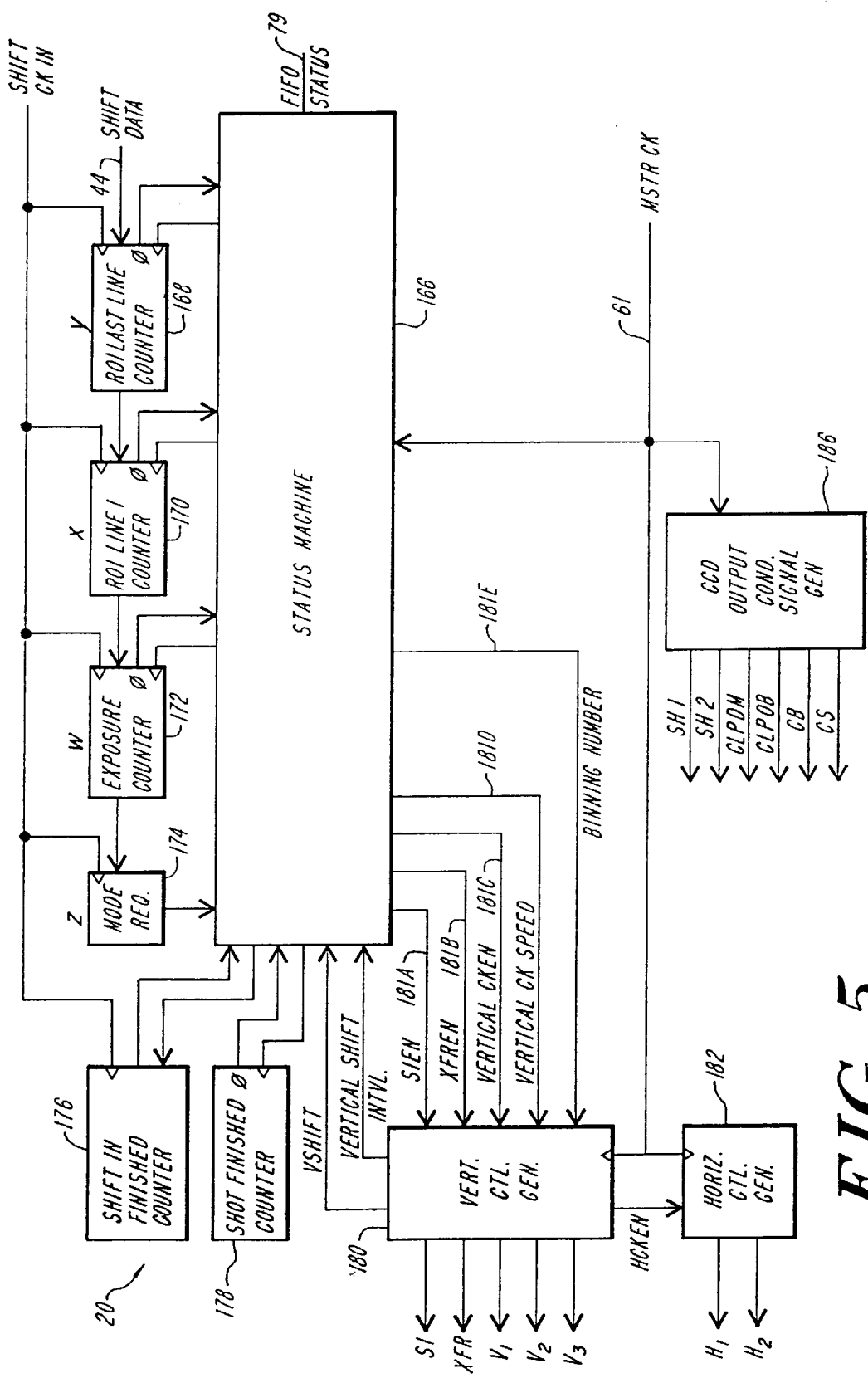
FIG. 5 is a more detailed schematic depiction of the camera of FIG. 2.

FIG. 4 and 5 illustrate in further detail the programmable imager controller 20 and camera 16 of the present invention. As shown, the camera trigger signal 44 representative of camera control information is transmitted to the programmable imager controller 20, along with any FIFO status signal 79, described further below, and the camera timing signal 58B of the camera oscillator 58. In response, the programmable generator 20 produces a number of output signals, e.g., SD, V1, V2, V3, XFR, H1, H2, RG, Sh1, Sh2 ClpDm, IPOp, CB, and Cs, as well as an output signal that is transmitted to the image processor 60. The illustrated output signals communicate with an image processor 60, a CCD power regulator 152, a vertical driver 156, and a CCD sensor array 160. The CCD power regulator 152 converts the input signal 152B to a DC output signal 152A that communicates with the CCD sensor array 160 and with the vertical driver 156. To preserve data integrity, the charge pumping by the CCD power regulator 152 is synchronized with the CCD sensor array 160 so that the switching transients associated with the DC output voltage do not interfere with the transfer, storage or processing of analog image data.

The output signals V1–V3 cause the vertical driver 156 to drive or control the vertical shifting of the vertical array of registers 80. The signal SD initiates the purging of charge from the sensor array, as described in further detail below. The output signals H1 and H2 drive the horizontal array of registers 82 during operation.

The operation and use of the illustrated image processor 60, CCD power regulator 152, vertical driver 156, and CCD sensor array would be obvious to the ordinary skilled artisan in the field of electrical engineering.

With reference to FIG. 5, the programmable imager controller 20 of the present invention can be characterized by an illustrated state machine 166 connected to a number of serially connected registers 168–174, which load the camera trigger signals 44 generated by the camera loader 42. The programmable imager controller 20 also includes a shift-in finished counter 176, and a shot-finished counter 178, a vertical control generator 180, a horizontal control generator 182, and a CCD image processor signal generator 186.

Figure 7:
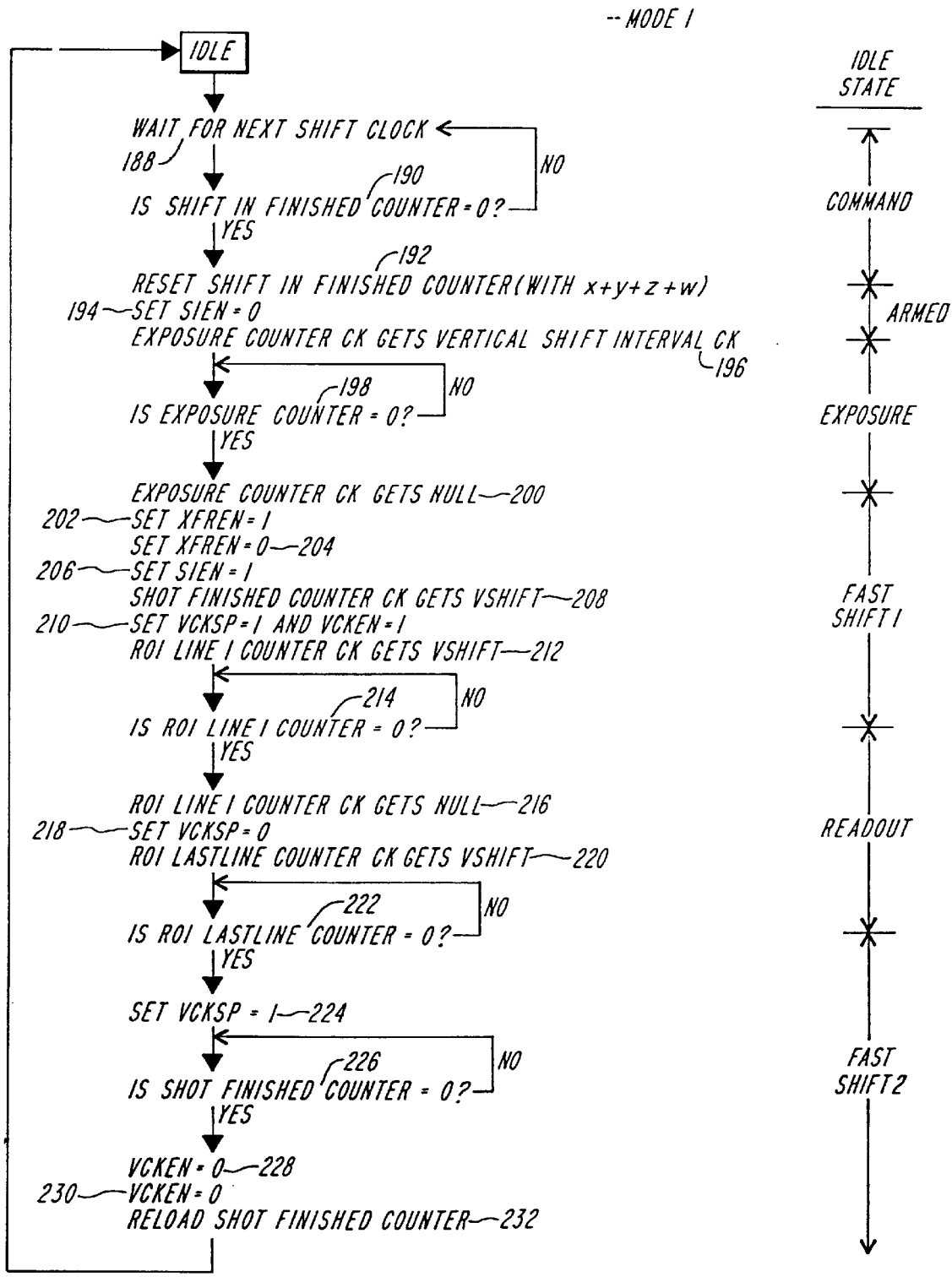
FIG. 7 is a flow chart state diagram illustrating the operation sequence of the programmable imager controller according to one mode of operation.

FIG. 7 illustrates a flow chart schematic diagram of the state machine and associated circuitry of the programmable imager controller 20 of the present invention. During operation, the illustrated timing generator 20 waits for the next communication packet to be received, as illustrated in step 188. According to step 190, the communication complete counter 176 is checked to see if it is equal to zero. If it is not, the timing generator 20 continues to receive command data. If the counter 176 is equal to zero, the appropriate counters are loaded with the camera control information 44 designated by instruction bits x, y, z and w as illustrated in FIG. 5. The state machine 166 then produces a SIEN output signal 181A which is received by the vertical control generator 180, according to step 194. In step 196, the exposure counter 172 receives the vertical shift interval clock signal, and according to step 198, the system checks to see if the exposure counter 172 is equal to zero. If it is, the exposure counter 172 is cleared, i.e., is nulled, as illustrated by step 200. The state machine 166 then toggles the signal carried along 181B and received by the vertical control generator between a logical high and a logical low, as illustrated by steps 202 and 204. Thereafter, the state machine 166 generates a logic high along 181A, as shown by step 206.

According to step 208 the shot-finished counter clock 178 receives a vertical shift signal. According to step 210, the state machine 166 generates logical highs along paths 181C and 181D.

In accordance with step 212, the ROI (region of interest) line counter 170 is vertically shifted until this counter is zero, as illustrated by steps 214 and 216. At this time, the state machine 166 sets the vertical clock's speed to a logical low along path 181D. This is received by the vertical control generator 180 (step 218). The ROI last line counter 168 is likewise vertically shifted until the counter reaches zero, in accordance with steps 220 and 222. The state machine 166 then generates a logical high along path 181D. The illustrated system then checks to see if the shot-finished counter 178 is equal to zero. If so, the system produces logical lows along paths 181C and 181D, as illustrated by steps 228 and 230. The programmable imager controller 20 then reloads the shot-finished counter, in accordance with step 232. Those of ordinary skill will recognize that the block diagram schematic depiction of the programmable imager controller 20 in conjunction with the flow chart diagram illustrating the operation thereof effectuate the vertical and horizontal clocking of the registers of the CCD sensor array, as well as effectuate the purging of charge from the photosites of the CCD array.

FIG. 6 shows, in tabular format, the states of selected gates of the programmable imager controller during image acquisition and transmission.

During image acquisition, the signals SIEN and XFREN cooperate to enable image exposure. SIEN drops to logical 0 to arm the camera for exposure. Note that SIEN does not trigger the exposure. Exposure begins when XFREN transitions from a logical 0 to a logical 1 and ends when XFREN returns to its idle state at logical 0. Upon termination of exposure, SIEN reverts back to a logical 1, thereby disarming the camera.

During image transmission, VCKEN transitions to a logical 1 to arm the transmission of data from the camera to the acquisition board. For lines of image data forming part of the region of interest, the transmission alternates between a fast shift step during which image data is vertically shifted one line at a time from the vertical array of registers to the horizontal array of registers and a readout step during which the line of image data is shifted out of the horizontal array. VCKEN remains at a logical 1 throughout both of these steps.

Switching between the fast shift step and the slower readout step is controlled by the signals VCKSP and HCKEN. During the fast shift step, VCKSP is set to logical 1. VCKSP drops to logical 0 to arm the readout step. Note that VCKSP does not actually initiate the readout step. Readout begins when HCKEN drops to a logical 0 and ends when HCKEN returns to a logical 1.

Allocation of Memory for Storage of Acquired Image

As set forth above, the process of allocating memory for storage of an acquired image can occur independently of and concurrent with image acquisition. This memory allocation method, which will be referred to as "hardware scatter/gather," makes use of a modern operating system's ability to perform dynamic memory allocation.

In hardware scatter/gather systems, the system's memory manager, upon request of a software application, will allocate memory for image storage. Once the memory is no longer needed for image storage, the memory manager can return the allocated memory to a common memory pool for use in subsequent computing tasks. In this way, the system can allocate a different memory address to each frame and can allocate only the amount of memory necessary at any instant. Since memory allocation can proceed concurrently with image acquisition, throughput of the system is improved and acquisition of an image can be triggered with a minimum of latency.

Dynamic memory allocation algorithms are available in many modern operating systems. The use of such dynamic memory allocation is thus well within the capability of one having ordinary skill in the art of computer engineering.

Pixel Sensitivity Correction

Figure 8A:
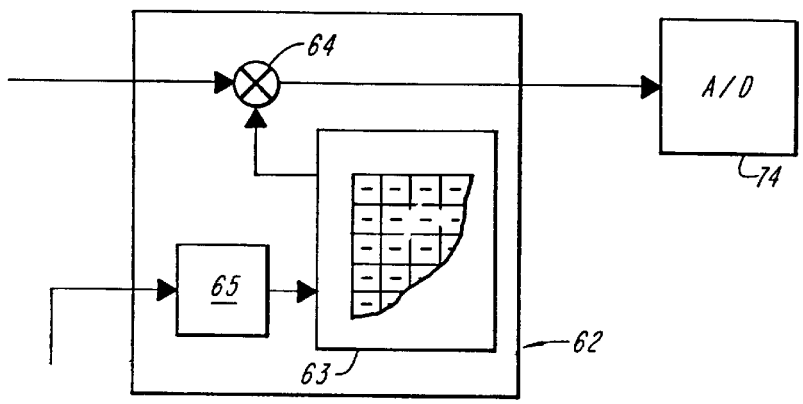
FIG. 8A is block diagram of the pixel sensitivity correction unit used to calibrate or filter the output of the photosensitive elements that constitute the image acquisition elements.
Figure 8B:
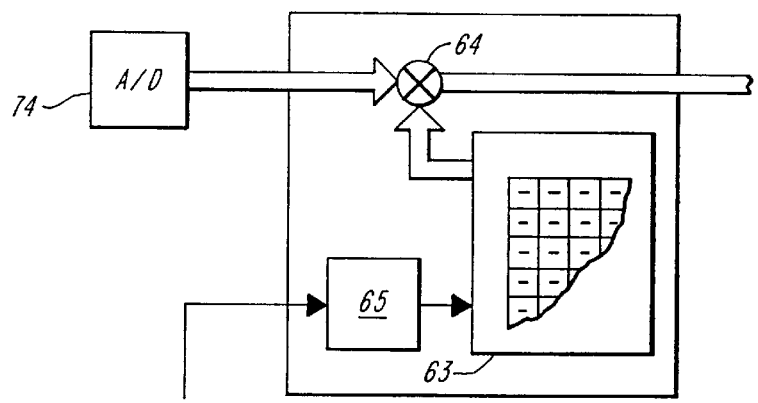
FIG. 8B is a block diagram of a pixel sensitivity correction unit connected to the digital input of the A/D converter component of the acquisition system of FIG. 1.

With reference to FIGS. 2, 8A, and 8B, according to an optional feature of the invention, the image processor output signal 61 is transferred to a pixel sensitivity correction module 62 which multiplies the output corresponding to each photosite 70 by a predetermined pixel sensitivity factor. This pixel sensitivity factor can compensate for the differing response characteristics of each photosite 70 or for errors caused by the inability to precisely control the scene illumination. Additionally, the multiplication of the output corresponding to each photosite 70 by its corresponding pixel sensitivity factor can result in spatial filtering of the acquired image. In this way, the pixel sensitivity correction module 62 can perform a preliminary image processing step in real time without interrupting the host processor 120. Since the preliminary image processing step performed by the pixel sensitivity correction module 62 would otherwise have to be performed by the host processor 120, the presence of the pixel sensitivity correction module 62 saves overall processing time and increases the throughput of the system.

Referring to FIG. 8A, the pixel sensitivity correction module 62 comprises memory that stores a pixel sensitivity factor storage table 63, which includes the pixel sensitivity factors and a multiplier 64. Additionally, the pixel sensitivity correction module 62 can include a counter 65 which rolls over at the number of pixels in the region of interest.

In the illustrated embodiment, the pixel sensitivity correction module 62 is connected to the analog side of the A/D converter 74. However, the pixel sensitivity correction module 62 can also be connected to the digital side of the A/D converter 74, as shown in FIG. 8B.

The output of the pixel sensitivity correction module is connected to the analog input of an analog-to-digital (A/D) converter 74 which converts the analog output signal of the camera to a digital signal. The construction of such converters is well known in the art of electrical engineering and suitable converters are commercially available. In one practice of the invention, the A/D converter 74 can be a component of the camera 16. In such a case, the pixel sensitivity correction module would be connected to the digital side of the A/D converter 74 as shown in FIG. 8B.

In operation, the pixel sensitivity correction module 62 accepts data from either the image processor 60 as shown in FIG. 8A or the digital side of the A/D converter 74 as shown in FIG. 8B. In either case, the pixel sensitivity correction module uses its counter 65 to determine which entry from the pixel sensitivity factor storage table 63 corresponds to the pixel currently at the input to the pixel sensitivity correction module 62. The corresponding entry from this storage table is then made available to the multiplier 64 which multiplies it by the value of the pixel currently at the input to the pixel sensitivity correction module 62. The product is then transmitted from the multiplier 64 to the analog input of the AID converter 74 as shown in FIG. 8A and in FIG. 2 or to the data FIFO 78 as shown in FIG. 8B. In most embodiments, an adder precedes the multiplier 64. This adder modifies the pixel value by a unique offset correction stored in parallel with the sensitivity correction factors.

Data Transmission from the Data FIFO to the Host Computing System

Each camera 16 in the illustrated system 10 has associated with it a data FIFO 78 in which image data accumulates as it arrives from the camera 16. This data FIFO 78 is periodically emptied by transmitting the accumulated data stored within it to the memory location allocated for that camera 16, the starting physical address and extent of which are stored in the destination address store 90. The data FIFO 78 is generally emptied when the amount of accumulated data reaches some data FIFO threshold. The data FIFO 78 can be emptied of accumulated data at times independent of the times at which data arrives at the data FIFO. For this reason, the data FIFO makes possible the asynchronous transfer of data between the camera 16 and the host computing system 12. As used herein, the term "data FIFO" is intended to include contiguous and non-contiguous memory and registers, including FIFO and other memory types. The memory or register can form part of the memory of the host device, or can be implemented in SRAM, DRAM, FLASH, or remote drives, or on other memory associated with a dedicated electrical circuit used in conjunction with the camera 16 and the host computing system 12 of the invention.

This occurs when the acquisition board 14 performs a DMA (direct memory address) transfer of the data to the address locations defined in the camera destination address store 90. The camera destination store 90 is preferably pre-loaded with an appropriate address definitions by the host processor 120 of the host computing system 12. The choice of this data FIFO threshold is important for the efficient and economical functioning of the system. If the data FIFO threshold is chosen too high, it becomes necessary to use data FIFO's having sufficient capacity to store the data. Such high capacity data FIFO's can be prohibitively expensive. If, on the other hand, the data FIFO threshold is too low, the system 10 will have to frequently access each FIFO, retrieving only a small amount of data therefrom. This is an inefficient use of system resources.

In the illustrated embodiment, the image acquisition performed by the camera 16 can be conveniently interrupted between the end of one line of the image and the beginning of the next line. Thus, a convenient data FIFO threshold is a single line of the image. However, the invention is not restricted to the use of a single line of the image as the data FIFO threshold.

The transmission of image data from the data FIFO 78 to the host memory 116 proceeds until the last line of data corresponding to the selected region of interest has been transmitted. The accumulated data retrieved from the data FIFO 86 is transferred to the PCI bus 100 through the bus interface 102 and then transferred through the IO manger to host memory, significantly reducing the number of times the host processor 120 is interrupted, thus increasing the processing speed and efficiency of the overall system 10. The co-processor 124 also communicates with the memory bus 110. Prior systems utilize the host processor 120 to perform each data transfer thereby requiring that the processor be interrupted for each data transfer. The present invention overcomes this drawback by using DMA to move relatively large blocks of image data, thereby significantly reducing the number of host processor interrupts. According to a preferred practice, the IO manager 120 is interrupted during acquisition of the region of interest. The software stored in the host computing system, e.g., cam.dll, calculates the number of pixels received from the region of interest and transmits the trigger threshold parameters to the proximity evaluator 88. The parameters transmitted to the proximity evaluator 88 preferably define a summary statistic for a portion of the region of interest whose values are monitored to determine when the object whose image is to be captured is present in the camera's field of view. The pixel value contained within proximity evaluator 88 is then compared with a preselected value stored in the proximity register store 52. When this value is reached, the proximity evaluator 88 generates a proximity evaluator output signal 88A that is transferred to the camera loader 42. In response, the camera loader generates another set of instructions which are transferred to the programmable imager controller 20.

Interruption of Data Transfer

A significant advantage of the image acquisition system 10 of the invention is that it compensates for the unpredictable delays in transferring image data from the camera 16 through the acquisition board 14 to the memory 128 of the host computer. This is accomplished by the real-time interruption, for a selected period of time, of data transmission by each camera, before data path overflow occurs. Any data already acquired by the camera 16 but not yet transmitted to the acquisition board 14 is stored in the camera's own storage facility, e.g., in the vertical array of registers 80, for the duration of the interruption period. This provides for a cost-effective method of storing the untransferred portion of an image.

Data transmission from the camera 16 can be interrupted as frequently as necessary. Moreover, interruption can occur not only between frames but at the conclusion of transmission of any preselected subset of the frame. For example, according to one practice, interruption can occur between the end of one line and the beginning of the next line. This is advantageous since data traffic on the host computing system 12 is an unpredictable function of all the activity in the system, much of which is often unrelated to the transfer of image data. Systems lacking a reliable method of managing data traffic can fail to provide the high fidelity data transmission required by machine vision and other image processing systems. For example, prior systems are known to randomly drop lines or even large portions of a frame of image data. In machine vision applications, this loss of image data can result in improper functioning of the system.

With further reference to FIG. 2, while the acquisition board 14 is performing this DMA data transfer, additional image data continues to be read into the data FIFO 78. This data is bundled together and transferred to the next address location unless other traffic on the host computer's I/O bus 100 delays this transfer. In the event that bus traffic prevents the transfer long enough for more than an arbitrarily large fraction of the data FIFO to be filled, a data FIFO status bit 79 is asserted and transmitted to the camera 16. If the data FIFO status bit 79 is received by the programmable imager controller 20, the programmable imager controller 20 interrupts data transfer by interrupting the next vertical shifting of data into the vertical array of registers 80 and, optionally, by interrupting the read-out of image data from the horizontal array of registers 82. This interruption is advantageous since it ensures that no amount of acquired optical data is lost, e.g., a dropped line or frame, due to data traffic in the host computing system. The data FIFO status bit 79 provides for a feedback loop between the acquisition board 14 and the programmable imager controller 20 for sensing data overflow. In response to this interruption, the camera 16 retains the data within the CCD vertical registers 80 for as long as necessary for the host computing system 12 to resume accepting DMA transfers. This feedback process results in a highly reliable and cost effective image acquisition system in which the acquisition hardware itself is used to temporarily store the acquired image data. Furthermore, through this interruption feature and its associated feedback loop, the invention maintains the integrity of the acquired data and nearly eliminates the loss or corruption of data due to unpredictable latency periods in performing DMA transfers.

A transfer-complete interrupt is communicated via the host to the client executable when the programmable imager controller 25 signals that all pixels from the region of interest have left the camera head 16, and the value of FIFO status$_x$ 79 indicates that the Data FIFO is empty. This interrupt is preferably generated after the last byte of image data has been flushed through the system.

Purging the CCD Array

After the transfer gate of the CCD array is restored to its normal status, the programmable imager controller 20 sends a continuing set of pulses to the CCD array circuit 54 to purge the photosites of any accumulating charge until the next exposure. This ensures that unwanted optical data is neither stored nor processed by the acquisition system 10. This purging process preferably continues in parallel with other operations until the next exposure command is generated by the camera loader 42 the camera is operating in pipelined exposure mode.

Referring to FIG. 4, to purge the CCD array, the programmable imager controller 20 transmits the signal SD to the vertical driver 156. This causes the vertical driver 156 to rapidly shift the contents of the vertical array of shift registers 80 into the horizontal array of shift registers 82. This rate at which data is shifted from the vertical array of shift registers 80 into the horizontal array of shift registers 82 is typically much faster than the rate at which the horizontal array of shift registers can be shifted horizontally. However, since purging occurs only when the data in the vertical array of shift registers is of not interest, the corruption of data in the horizontal array of registers is unimportant.

Transmission from the VGA FIFO to the Video Display

The digital data signal 75 of the A/D converter 74 is also transferred to a display FIFO 94. The display FIFO 94 stores the image data for subsequent processing and display on a display monitor (not shown). The digital data signal 75 from by the A/D converter 74 is converted to a signal suitable for the display monitor by the lookup table (LUT) 96. The destination address for the data stored in the display FIFO 94 is stored in the display destination address store 108. The address store holds the storage address of the memory location to which the acquired data is to be transferred. As used herein, the term "display FIFO" is intended to include any appropriate memory location that can store data in selected byte sizes.

Another advantage of the present invention is that it does not use phased lock loops. Phase locked loops are prone to timing errors which can result in pixel jitter and skew. Consequently, the image acquisition system of the present invention reduces pixel jitter substantially to zero. Moreover, the absence of phase locked loops simplifies the data path and reduces system cost.

Modes of Operation

The image acquisition system of the present invention has several modes of operation. According to a triggering mode, the image acquisition system can be externally triggered. This can occur when a trigger from machinery external to both the camera 16 and the host computing system 12 sends a signal (typically a signal having an edge) to an external trigger interface 34 having n inputs, one for each of the n cameras connected to the system. The arrival of the pulse edge on one of the external trigger inputs 36 triggers the camera loader 42 to generate and to transfer a camera trigger signal 44 to the camera 16 designated by the particular external trigger input 36. The camera trigger signal 44 is then transferred to the programmable imager controller 20 for the selected camera 16.

At the expiration of the preselected exposure time, the programmable imager controller 20 initiates a charge transfer from the photosites 70 of the CCD array circuit 54 to its vertical array of registers 80. The image data representative of the region of interest is then clocked out of the vertical array of registers 80 and into the horizontal array of registers 82. Image data from outside the region of interest is clocked out of the vertical registers and into the horizontal array of register 82 at speeds significantly greater than the speed at which data can be clocked out of the horizontal register. This selectively fast "dumping" of unwanted image data allows the system 10 to access and to obtain relatively quickly the image data corresponding to the region of interest. The acquired image data that results from overwriting the data in the horizontal array of registers is ignored.

After the transfer gate of the programmable imager controller 20 is restored to its normal status, the imager controller transfers a set of pulses to the CCD array circuit 54 that causes the CCD to continuously extract charge building up in the photosites of the array. This process preferably continues in parallel with other operations until the exposure for the next image begins.

For the number of lines in the region of interest, the programmable imager controller 20 drives the CCD array circuit 54 at a rate that provides uncorrupted image data to the computing host system 12. The image data is conditioned in the camera 16 by the image processor 60 after which it is transferred to the acquisition board 14. The acquisition board 14 can include a pixel sensitivity correction module 62 for multiplying each pixel of the image by a predetermined pixel sensitivity factor and collects the resulting image data in the data FIFO 78 until the amount of accumulated data reaches a threshold. The acquisition board 14, in conjunction with the host computing system 12 then performs a DMA transfer (a data burst) of the accumulated data to the address defined in the camera destination store 90. These addresses preferably correspond to the first physical block of memory of the currently specified image buffer. Data continues to be read into the data FIFO 78 even during the DMA transfer.

When the data in the data FIFO 78 again accumulates past the threshold, another DMA transfer is made to the next starting address, unless bus loading by other data traffic on the host computer's I/O bus delays this transfer. In the event that bus traffic prevents the transfer of data long enough for more than half of the data FIFO to be filled, the data FIFO status bit is asserted. When this occurs, the data FIFO's associated camera suspends data acquisition and transmission and holds any already acquired data within the vertical array of registers 80 of the CCD until the host computer can resume accepting DMA transfers. This process proceeds the last line of the region of interest is transmitted to the memory of the host computing system 12.

When the last line of the region of interest is read or shifted out of the horizontal register, the programmable imager controller 20 generates a "fast shift" signal which instructs the CCD array 54 to dump all remaining data associated with the originally acquired image. This data purge is accomplished in the manner described above. At this point preferably all of the vertical array of shift registers 80 are free of charge. All of the photosites 70 are also preferably empty since the timing generator 20 pulses the CCD array 54 such that the array removes any charge from the photosites 70. In this way, the camera 16 is ready to receive another image acquisition command.

Once all DMA transfers of image data are completed, the host computing system 12 responds to the controller's 14 activation of one of the interrupt lines on the host's I/O bus to trigger the processing of the interrupt code, i.e. cam.VxD 137, that was loaded by the cam.exe program 132 at boot time. The interrupt code 137 makes a call-back to memory maintained by cam.dll 138 that stores the handle of the process that client.exe (or cam.exe) has most recently designated to receive notice that a particular image buffer has been filled with new data.

According to another mode of operation referred to as "immediate mode,", the image acquisition system of the invention can be used to accommodate both image analysis and machine vision applications. In this mode of operation, data resulting from processing an earlier image dictates the next action to be taken.

Accordingly, in this mode, the acquisition board 14 waits for a command from the host to be written before initiating an image acquisition and processing cycle similar to that described above. Either client.exe 134 or cam.exe 132 makes a call to cam.dll 138 to have the command transmitted. The arrival of this command causes the camera loader 42 to transmit the camera trigger signal 44 containing information from the camera setup store 48 to the particular camera designated by that byte. The remaining steps of image acquisition and transfer proceed as described above.

According to still another mode of operation, images can be taken at fixed time intervals from a selected camera. These time intervals to selected and can be any value greater than or equal to the minimum time compatible with the selected exposure time and the time required to transfer the region of interest. This mode of operation is identical to that described immediately above with the exception that the trigger for initiating image acquisition by the selected camera is an associated timer forming part of the camera loader 42.

In this mode, either cam.exe 132 or client.exe 134 makes a call to cam.dll 138 that sends a command to the host computing system 12 and/or the acquisition board 14. This command includes a particular target camera and a data word used to set the associated timer in the camera loader 42. Every time the timer for the selected camera times out, the camera loader 42 sends a camera trigger signal 44 to begin acquisition by the selected camera.

In response, an image is returned from the selected camera 16 and transferred to host memory 116, each time that the timer associated with that camera times out.

According to yet another mode of operation, the image acquisition system provides for continuous image acquisition at a rate constrained only by the size of the region of interest and the exposure time. This mode begins with a request by cam.exe 132 or client.exe 134 that particular camera setup information be sent from the camera setup store 48 to a particular camera 16 via the host interface of the acquisition board 14. The camera setup information causes the camera 16 to initiate an exposure and readout of image data, as set forth above in relation to the description associated with FIGS. 1–3. The camera's response in this mode differs in that after exposure is complete, the programmable imager controller 20 does not immediately pulse the CCD array 54 to clear the photosites of charge.

According to one preferred practice, if cam.dll 138 calculates that an exposure time longer than the readout time for the region of interest, then the camera setup information contained in the camera trigger signal 44 causes the programmable imager controller 20 to begin the next exposure immediately after the transfer of the image data. The foregoing purging of charge from the photosites does not occur since the next exposure taken by the camera 16 continues while the vertical array of registers 80 containing the image data from the previous exposure is read into the horizontal array of registers 82. The acquisition of additional frames continues beyond the end of the readout of the previously acquired data, until the appropriate exposure time is reached. At this time, the timing generator 20 commands a "frame transfer," and begins both another exposure and another readout. The process repeats until new camera setup information is transmitted to the camera 16 from the camera setup store 48.

If, on the other hand, cam.dll 138 calculates a readout time for the region of interest longer than the exposure time, then the camera setup information contained in the camera trigger signal 44 causes the programmable imager controller 20 to begin purging charge from the photosites after a frame transfer and to continue to purge charge for a time interval as long as the excess of the readout-time over exposure-time. When the image transfer is completed, the programmable imager controller 20 initiates another "frame transfer," resumes charge purging, and begins another readout. This process continues until new camera setup information is transmitted from the camera setup store 48 to the camera 16.

In the event that FIFO status signal 79 is asserted for long enough to substantially affect the exposure during a cycle, the programmable imager controller 20 terminates the readout of image data for that cycle. Readout resumes at the beginning of the region of interest for the data then in the photosite region.

Figure 9:
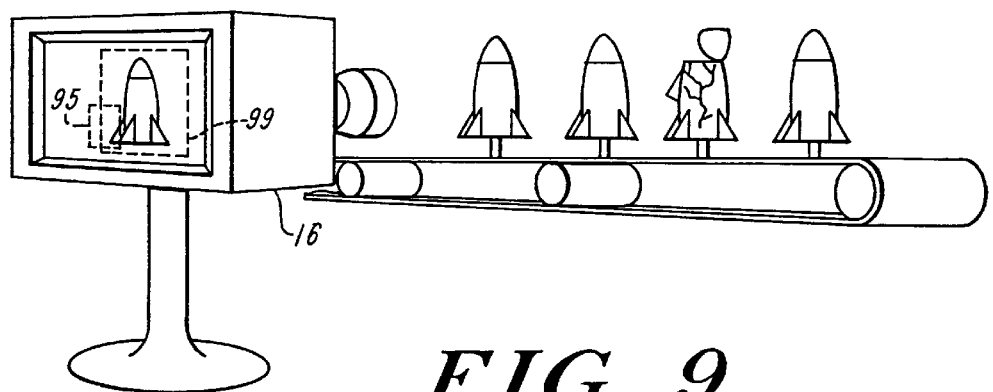
FIG. 9 is an illustration of the trigger region and a region of interest within the camera's field of view.

According to still another mode of operation, the system 10 can recognize when a subject of interest is within a triggering region 95 in the camera's field of view as shown in FIG. 9. Upon recognizing that a subject of interest has entered the triggering region 95, the system autonomously triggers the capture of a region of interest 99, also shown in FIG. 9, within the cameras field of view and transmits the image data corresponding to that region of interest to the system's memory and/or to the system's display. The size and location of the triggering region 95 is independent of the size and location of the region of interest 99. This mode greatly facilitates automated image processing by allowing the user or client software to adaptively control, based on the presence of an object in the field of view, when image acquisition will occur.

This mode of operation is similar to the immediately preceding mode. Generally, the camera trigger signal 44 will include one or more thresholds which will be used by the acquisition board to determine whether an image of the region of interest should be acquired. These thresholds are previously calculated by cam.dll 138 and loaded into the camera setup store 48. In addition, the camera trigger signal 44 can contain information necessary to define a triggering region in a manner similar to that used and already described for defining the region of interest.

In this mode, the trigger region is repeatedly captured and transmitted to the acquisition board 14 according to the procedure identified above for transmitting image data to the acquisition board. However, rather than being routed, as in the other modes, to the data FIFO 78, image data from the triggering region is sent to the proximity evaluator 88 which accumulates the values of the pixels arriving from the triggering region. Upon completion of the transfer of the trigger region for a given frame, the summary statistics of the pixels from the trigger region, now stored in the proximity evaluator 88, is used to determine whether the image from the region of interest should be captured. If the system determines that the accumulated value is such that the image from the region of interest should be captured, then that image is routed to the data FIFO 78 as described earlier. If, on the other hand, the system determines that the accumulated value is such that no image from the region of interest should be captured, then another trigger region is captured, accumulated and compared.

Whether or not to acquire an image from the region of interest 95 based on the image in the trigger region 99 can depend on the sum of the values of the pixels in the trigger region or on the deviation of the values of the pixels in the trigger region.

In one implementation of this mode, whether or not an image from the region of interest is captured can depend on whether the accumulated value of the pixels in the trigger region is above or below a threshold. In a second implementation of this mode, there can be n thresholds and the capture of an image from the region of interest can be conditioned on which of the n+1 intervals defined by the n thresholds the accumulated value of the pixels from the trigger region falls into. In a third implementation of this mode, the capture of an image from the region of interest can be conditioned on whether or not the deviation of the summary statistics of the pixels from the trigger region from some norm falls above or below a programmed deviation threshold. Further implementations of this mode can be obtained by various boolean combinations of the above conditions.

The acquisition of an image from a region of interest can also be conditioned on the satisfaction of a temporal condition. For example, the system can be made to acquire an image from the region of interest only when the time interval between the proposed acquisition and the last acquisition is in excess of some temporal threshold. A temporal condition such as this can be combined with the conditions on accumulated pixel values and deviations as outlined above. Absent such a feature, an extended and homogenous object slowly traversing the camera's field of view could result in multiple exposures of the same object.

In yet another mode of operation, an image from one camera operating in the mode immediately above can trigger image acquisition and transfer by another camera connected to the system.

In yet another mode of operation, the camera loader generates outputs, synchronized to each camera, to trigger eternal illumination systems such as flash units.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A system for transmitting an image to a machine vision system having a host processor that allocates memory for storage of said image, said system comprising:

image acquisition means for acquiring at least a portion of said image in response to a trigger signal, memory means for storing data representative of said image, image transfer means for transferring said image from said image acquisition means to said memory means, said image transfer means including buffer memory means for temporarily storing said at least a portion of said image pending allocation of memory space from said memory means by the host processor, said buffer memory means including a data FIFO register coupled to receive data representative of said image from said image acquisition means and to release data representative of said image to the host processor in response to a release signal, and direct memory address data transfer means for transferring said image data accumulated in said data FIFO register directly memory allocated in a host computer system, whereby said data transfer substantially reduces the number of times said system interrupts the host processor wherein said image acquisition means can operate substantially independently of the allocation of memory by the host processor.

2. A system according to claim 1, wherein said buffer memory means comprises a plurality of registers, said plurality of registers being coupled to receive data representative of said image from said image acquisition means in response to said trigger signal and to release data representative of said image to the host processor in response to a release signal.

3. A system according to claim 1, wherein said image acquisition means comprises photo-sensitive means for acquiring said image in response to said trigger signal containing selected image acquisition parameters, and programmable control means in circuit with said photo-sensitive means for generating said trigger signal and for programmably altering during acquisition of said image said selected image acquisition parameters.

4. A system according to claim 3, wherein said programmable control means includes a programmable imager controller circuit operating at a driving frequency, said programmable imager controller circuit adapted to be programmed with said image acquisition parameters and having means for automatically changing said driving frequency during acquisition of said image.

5. A system according to claim 3, wherein said buffer memory means comprises one or more vertical registers coupled to said photo-sensitive means for storing optical energy representative of said acquired image, and one or more horizontal registers positioned to receive at least a portion of said optical energy stored in said vertical register.

6. A system according to claim 5, wherein said photo-sensitive means is adapted to acquire a region of interest corresponding to at least a portion of said image, and wherein said means for transferring tranfers a portion of said optical energy corresponding to a portion of said region of interest from said vertical register into said horizontal register, further comprising disabling means for disabling transfer of said optical energy from said horizontal register during said transfer of optical energy from said vertical register into said horizontal register, whereby said optical energy corresponding to a portion of said region of interest is rapidly transferred from said vertical register to said horizontal register without actively removing said stored energy from said horizontal register.

7. A system according to claim 6, wherein said photo-sensitive means is adapted to acquire a region of interest corresponding to at least a portion of said image, and wherein said means for transferring tranfers a portion of said energy stored in said vertical register corresponding to a portion of said region of interest into said horizontal register, further comprising enabling means for enabling transfer of said optical energy stored in said horizontal register therefrom, and disabling means for disabling transfer of optical energy from said vertical register into said horizontal register during said transfer of optical energy out of said horizontal register.

8. A system according to claim 1, further comprising pre-processing means separate from the host processor for receiving said image data and for at least partially processing said data without substantially interrupting the host processor.

9. A system according to claim 1, further comprising interrupt means coupled to said data FIFO register and to said image acquisition means for interrupting said acquisition of said image when said data FIFO register is at least substantially full, thereby permitting reliable transfer of data corresponding to said image.

10. A system according to claim 9, wherein said image is composed of a plurality of lines, and wherein said interrupt means is capable of interrupting said acquisition of said image between said lines corresponding to said image.

11. A system according to claim 1, further comprising feedback means coupled between said image acquisition means and said data FIFO register for monitoring said status of said register and for transferring an interrupt signal to said image acquisition means to interrupt said acquisition of said image, said feedback means including interrupt means coupled to said data FIFO register for generating said interrupt signal when said data FIFO register is at least substantially full, whereby said interrupt means immediately and temporarily interrupts said acquisition of said image.

12. A system according to claim 1, wherein said image acquired by said image acquisition means includes a plurality of pixels, further comprising pixel correction means in circuit with said image acquisition means for correcting said pixels prior to transfer to said memory means.

13. A system according to claim 12, wherein said pixel correction means comprises second memory means for storing a plurality of predetermined pixel correction values corresponding to each pixel of said image, and multiplier means for multiplying each pixel of said image by said corresponding pixel correction value, thereby forming a corrected pixel.

14. A system according to claim 12, wherein said pixel correction means is separate from the host processor and performs said pixel correction in real time.

15. A machine vision system for acquiring an image, said system comprising:

image acquisition means for acquiring said image, said image acquisition means including means for altering image acquisition parameters prior to acquisition of said image and image correction means for multiplying a subset of said image by a correction value corresponding to said subset of said image;

memory means for storing said image;

image transfer means for transferring said image from said programmable image acquisition means to said memory means, said image transfer means including means for interrupting transfer of said image at an interruption point, and means for resuming transfer of said image from said interruption point.

whereby resuming said acquisition of said image at said interruption point substantially prevents loss of data corresponding to said image.

16. A system according to claim 15, wherein said image acquisition means includes means for defining at least one region of interest, said at least one region of interest being a subset of said image, and means for acquiring said at least one region of interest.

17. A system according to claim 15, wherein said image acquisition means comprises means for programmably controlling the amount of optical energy corresponding to said image collected by a camera.

18. A system according to claim 15, wherein said image acquisition means includes trigger means for initiating acquisition of said image in response to a trigger signal.

19. A system according to claim 15, wherein said image correction means comprises image input means for accepting data representative of said image, storage means for storing said correction factor corresponding to said subset of said image, said storage means having input means responsive to an external signal, multiplier means coupled to said storage means and coupled to said image input means for multiplying said correction value with said corresponding subset of said image, and data counter means coupled to said storage table means for determining correspondence between said subset of said image and said correction value.

20. A system according to claim 15, wherein said image acquisition means includes means for encoding an acquisition time into said image.

21. A system according to claim 20, wherein said means for encoding an acquisition time into said image comprises kernel level software in communication with a host processor, said kernel level software being responsive to a camera trigger signal.

22. A system according to claim 15, wherein said image transfer means includes a data FIFO memory for storing data and for releasing data asynchronously.

23. A system according to claim 15, wherein said image transfer means includes programmable imager data transfer means for selectively controlling the rate at which data travels from said image acquisition means to said memory means.

24. A system according to claim 23, wherein said programmable imager transfer means comprises first data storage means for storing said image acquired by said image acquisition means, second data storage means coupled to said first data storage means, first shift means for shifting a subset of said image stored in said first data storage means to said second data storage means thereby storing said subset of said image in said second data storage means, second shift means for shifting said subset of said image stored in said second data storage means to said memory means, and disable means for disabling said second shift means during operation of said first shift means and to disable said first shift means during operation of said second shift means.

25. A system according to claim 15, wherein said image transfer means comprises first data storage means for storing said image acquired by said image acquisition means, second data storage means coupled to said first data storage means, first shift means for shifting a subset of said image stored in said first data storage means to said second data storage means thereby storing said subset of said image in said second data storage means, second shift means for shifting said subset of said image stored in said second data storage means to said memory means, and disable means for disabling said second shift means during operation of said first shift means and to disable said first shift means during operation of said second shift means, said disable means including means for operating said second shift means when said image stored in said second data storage means is inside said region of interest, and second disabling means for disabling said second shift means and operating said first shift means when said image stored in said second data storage means is outside said region of interest.

26. A system according to claim 15, wherein said image acquisition means comprises photo-sensitive means for acquiring said image in response to an acquisition signal containing selected image acquisition parameters, and programmable control means in circuit with said photo-sensitive means for generating said acquisition signal and for programmably altering during acquisition of said image said selected image acquisition parameters.

27. A system according to claim 26, wherein said programmable control means includes a programmable imager controller circuit operating at a driving frequency, said programmable imager controller circuit being adapted to be programmed with said image acquisition parameters and having means for automatically changing said driving frequency during acquisition of said image.

28. A system according to claim 26, wherein the host processor allocates memory for storage of said image, and wherein said programmable control means generates said acquisition signal substantially independently of allocation of the memory by the host processor.

29. A system according to claim 26, wherein the host processor allocates memory for storage of said image, and wherein said programmable control means generates said acquisition signal in parallel with and substantially independently of allocation of the memory by the host processor.

30. A system according to claim 15, wherein said memory means comprises a data FIFO register, wherein said means for transferring transfers said image into said register.

31. A system according to claim 30, further comprising data transfer means for transferring said image data accumulated in said data FIFO register to the host computing system.

32. A system according to claim 31, wherein said transfer of data from said data FIFO register is a direct memory address transfer, thereby substantially reducing the number of times the system interrupts the host processor.

33. A system according to claim 15, further comprising pre-processing means separate from the host processor for receiving said image data and for at least partially processing said data without interrupting said host processor.

34. A system according to claim 15, wherein said means for interrupting is coupled to said data FIFO register and to said image acquisition means for interrupting said acquisition of said image when said data FIFO register is full, thereby permitting reliable transfer of data corresponding to said image.

35. A system according to claim 15, wherein said means for transferring is adapted for immediately and temporarily interrupting said acquisition of said image.

36. An image acquisition system for connection to a machine vision system for acquiring an image of an object, said system having a host processor and comprising:

image acquisition means for acquiring said image of the object, said imaging including a plurality of pixels, said image acquisition means including photo-sensitive means for acquiring said image in response to an acquisition signal containing selected image acquisition parameters, and programmable control means in circuit with said photo-sensitive means for generating said acquisition signal and for programmably altering during acquisition of said image said selected image acquisition parameters, memory means for storing at least a portion of said image, pixel correction means in circuit with said image acquisition means for correcting said pixels prior to transfer to said memory means, said pixel correction means including second memory means for storing a plurality of pre-determined pixel correction values corresponding to each pixel of said image, and multiplier means for multiplying each pixel of said image by said corresponding pixel correction value, thereby forming a corrected pixel, and transfer means for transferring said image from said image acquisition means to said memory means.

37. The image acquisition system of claim 36, wherein said programmable control means includes a programmable imager controller circuit that operates at a driving frequency, said programmable imager controller circuit being adapted to be programmed with said image acquisition parameters including means for automatically changing said driving frequency during acquisition of said image.

38. The image acquisition system of claim 36, wherein said memory means comprises one or more vertical registers coupled to said photo-sensitive means for storing optical energy representative of said acquired image, and one or more horizontal registers positioned to receive at least a portion of said optical energy stored in said vertical register.

39. The image acquisition system of claim 38, wherein said photo-sensitive means is adapted to acquire a region of interest corresponding to at least a portion of said image, further comprising second means for transferring a portion of said optical energy corresponding to a portion of said region of interest from said vertical register to said horizontal register, and disabling means for disabling transfer of optical energy from said horizontal energy during said transfer of optical energy from said vertical register into said horizontal register, whereby said optical energy corresponding to a portion of said region of interest is rapidly transferred from said vertical register to said horizontal register without actively removing said transferred energy from said horizontal register.

40. The image acquisition system of claim 39, wherein said photo-sensitive means is adapted to acquire a region of interest corresponding to at least a portion of said image, further comprising second means for transferring a portion of said energy stored in said vertical register corresponding to a portion of said region of interest to said horizontal register, enabling means for enabling transfer of optical energy stored in said horizontal register therefrom, and disabling means for disabling transfer of optical energy from said vertical register into said horizontal register during said transfer of optical energy out of said horizontal register.

41. The image acquisition system of claim 36, wherein said memory means comprises a data FIFO register, wherein said transfer means transfers said image into said register.

42. The image acquisition system of claim 41, further comprising second transfer means for transferring said image data accumulated in said data FIFO register to the host computing system.

43. The image acquisition system of claim 42, wherein said second transfer means transfers data from said data FIFO register substantially independently of a memory manager of the host computing system.

44. The image acquisition system of claim 41, further comprising memory address transfer means for transferring said data stored in said data FIFO register directly to an address in the host computing system, thereby substantially reducing the number of times the system interrupts the host processor.

45. The image acquisition system of claim 41, further comprising pre-processing means separate from the host processor for receiving said image data and for at least partially processing said data without interrupting said host processor.

46. The image acquisition system of claim 41, further comprising interrupt means coupled to said data FIFO register and to said image acquisition means for interrupting said acquisition of said image when said data FIFO register is full, thereby permitting reliable transfer of data corresponding to said image.

47. The image acquisition system of claim 46, wherein said interrupt means is capable of interrupting said acquisition of said image between lines corresponding to said image.

48. The image acquisition system of claim 46, wherein said interrupt means is adapted for immediately and temporarily interrupting said acquisition of said image.

49. The image acquisition system of claim 36, wherein said pixel correction means is separate from one of the host processor and the host computing system and performs said pixel correction in real time.

50. A system for transmitting an image to a machine vision system having a host processor that allocates memory for storage of said image, said system comprising:

image acquisition means for acquiring at least a portion of said image in response to a trigger signal, said portion of said image including a plurality of pixels, memory means for storing data representative of said image, pixel correction means in circuit with said image acquisition means for correcting said pixels prior to transfer to said memory means, said pixel correction means including second memory means for storing a plurality of predetermined pixel correction values corresponding to each pixel of said image, and multiplier means for multiplying each pixel of said image by said corresponding pixel correction value, thereby forming a corrected pixel, and image transfer means for transferring said image from said image acquisition means to said memory means, said image transfer means including buffer memory means for temporarily storing said at least a portion of said image pending allocation of memory space from said memory means by the host processor, wherein said image acquisition means can operate substantially independently of the allocation of memory by the host processor.

51. A system according to claim 50, wherein said buffer memory means comprises a data FIFO register, said data FIFO being coupled to receive data representative of said image from said image acquisition means and to release data representative of said image to the host processor in response to a release signal.

52. A system according to claim 51, further comprising direct memory address data transfer means for transferring said image data accumulated in said data FIFO register directly memory allocated in the host computing system, whereby said data transfer substantially reduces the number of times said system interrupts the host processor.

53. A system according to claim 51, further comprising pre-processing means separate from the host processor for receiving said image data and for at least partially processing said data without substantially interrupting the host processor.

54. A system according to claim 51, further comprising interrupt means coupled to said data FIFO register and to said image acquisition means for interrupting said acquisition of said image when said data FIFO register is at least substantially fall, thereby permitting reliable transfer of data corresponding to said image.

55. A system according to claim 54, wherein said image is composed of a plurality of lines, and wherein said interrupt means is capable of interrupting said acquisition of said image between said lines corresponding to said image.

56. A system according to claim 51, further comprising feedback means coupled between said image acquisition means and said data FIFO register for monitoring said status of said register and for transferring an interrupt signal to said image acquisition means to interrupt said acquisition of said image, said feedback means including interrupt means coupled to said data FIFO register for generating said interrupt signal when said data FIFO register is at least substantially full, whereby said interrupt means immediately and temporarily interrupts said acquisition of said image.

57. A system according to claim 50, wherein said buffer memory means comprises a plurality of registers, said plurality of registers being coupled to receive data representative of said image from said image acquisition means in response to said trigger signal and to release data representative of said image to the host processor in response to a release signal.

58. A system according to claim 50, wherein said image acquisition means comprises photo-sensitive means for acquiring said image in response to said trigger signal containing selected image acquisition parameters, and programmable control means in circuit with said photo-sensitive means for generating said trigger signal and for programmably altering during acquisition of said image said selected image acquisition parameters.

59. A system according to claim 58, wherein said programmable control means includes a programmable imager controller circuit operating at a driving frequency, said programmable imager controller circuit adapted to be programmed with said image acquisition parameters and having means for automatically changing said driving frequency during acquisition of said image.

60. A system according to claim 58, wherein said buffer memory means comprises one or more vertical registers coupled to said photo-sensitive means for storing optical energy representative of said acquired image, and one or more horizontal registers positioned to receive at least a portion of said optical energy stored in said vertical register.

61. A system according to claim 60, wherein said photo-sensitive means is adapted to acquire a region of interest corresponding to at least a portion of said image, and wherein said means for transferring transfers a portion of said optical energy corresponding to a portion of said region of interest from said vertical register into said horizontal register, further comprising
disabling means for disabling transfer of said optical energy from said horizontal register during said transfer of optical energy from said vertical register into said horizontal register,
whereby said optical energy corresponding to a portion of said region of interest is rapidly transferred from said vertical register to said horizontal register without actively removing said stored energy from said horizontal register.

62. A system according to claim 61, wherein said photo-sensitive means is adapted to acquire a region of interest corresponding to at least a portion of said image, and wherein said means for transferring transfers a portion of said energy stored in said vertical register corresponding to a portion of said region of interest into said horizontal register, further comprising
enabling means for enabling transfer of said optical energy stored in said horizontal register therefrom, and
disabling means for disabling transfer of optical energy from said vertical register into said horizontal register during said transfer of optical energy out of said horizontal register.

63. A system according to claim 58, wherein said pixel correction means is separate from the host processor and performs said pixel correction in real time.

64. A machine vision system for acquiring an image, said system comprising:
programmable image acquisition means for acquiring said image, said programmable image acquisition means including means for altering image acquisition parameters prior to acquisition of said image;
memory means for storing said image, said memory means including
a data FIFO register for accumulating image data from said programmable image acquisition means, and
data transfer means for transferring said image data from said data FIFO register to a host computing system by a direct memory address transfer, thereby substantially reducing the number of times the system interrupts the host processor;
image transfer means for transferring said image from said programmable image acquisition means to said memory means, said image transfer means including
means for interrupting transfer of said image at an interruption point, and
means for resuming transfer of said image from said interruption point
whereby resuming said acquisition of said image at said interruption point substantially prevents loss of data corresponding to said image.

65. A system according to claim 64, wherein said image acquisition means includes means for defining at least one region of interest, said at least one region of interest being a subset of said image, and means for acquiring said at least one region of interest.

66. A system according to claim 64, wherein said image acquisition means comprises means for programmably controlling the amount of optical energy corresponding to said image collected by a camera.

67. A system according to claim 64, wherein said image acquisition means includes trigger means for initiating acquisition of said image in response to a trigger signal.

68. A system according to claim 64, wherein said image acquisition means includes image correction means for multiplying a subset of said image by a correction value corresponding to said subset of said image.

69. A system according to claim 68, wherein said image correction means comprises
image input means for accepting data representative of said image
storage means for storing said correction factor corresponding to said subset of said image, said storage means having input means responsive to an external signal,
multiplier means coupled to said storage means and coupled to said image input means for multiplying said correction value with said corresponding subset of said image, and
data counter means coupled to said storage table means for determining correspondence between said subset of said image and said correction value.

70. A system according to claim 64, wherein said image acquisition means includes means for encoding an acquisition time into said image.

71. A system according to claim 70, wherein said means for encoding an acquisition time into said image comprises kernel level software in communication with a host processor, said kernel level software being responsive to a camera trigger signal.

72. A system according to claim 64, wherein said image transfer means includes a data FIFO memory for storing data and for releasing data asynchronously.

73. A system according to claim 64, wherein said image transfer means includes programmable imager data transfer means for selectively controlling the rate at which data travels from said image acquisition means to said memory means.

74. A system according to claim 73, wherein said programmable imager transfer means comprises
first data storage means for storing said image acquired by said image acquisition means,
second data storage means coupled to said first data storage means,
first shift means for shifting a subset of said image stored in said first data storage means to said second data storage means thereby storing said subset of said image in said second data storage means,
second shift means for shifting said subset of said image stored in said second data storage means to said memory means, and
disable means for disabling said second shift means during operation of said first shift means and to disable said first shift means during operation of said second shift means.

75. A system according to claim 64, wherein said image transfer means comprises
first data storage means for storing said image acquired by said image acquisition means,
second data storage means coupled to said first data storage means,
first shift means for shifting a subset of said image stored in said first data storage means to said second data storage means thereby storing said subset of said image in said second data storage means, second shift means for shifting said subset of said image stored in said second data storage means to said memory means, and disable means for disabling said second shift means during operation of said first shift means and to disable said first shift means during operation of said second shift means, said disable means including means for operating said second shift means when said image stored in said second data storage means is inside said region of interest, and second disabling means for disabling said second shift means and operating said first shift means when said image stored in said second data storage means is outside said region of interest.

76. A system according to claim 64, wherein said image acquisition means comprises photo-sensitive means for acquiring said image in response to an acquisition signal containing selected image acquisition parameters, and programmable control means in circuit with said photo-sensitive means for generating said acquisition signal and for programmably altering during acquisition of said image said selected image acquisition parameters.

77. A system according to claim 76, wherein said programmable control means includes a programmable imager controller circuit operating at a driving frequency, said programmable imager controller circuit being adapted to be programmed with said image acquisition parameters and having means for automatically changing said driving frequency during acquisition of said image.

78. A system according to claim 77, further comprising data transfer means for transferring said image data accumulated in said data FIFO register to the host computing system.

79. A system according to claim 77, wherein the host processor allocates memory for storage of said image, and wherein said programmable control means generates said acquisition signal in parallel with and substantially independently of allocation of the memory by the host processor.

80. A system according to claim 76, wherein the host processor allocates memory for storage of said image, and wherein said programmable control means generates said acquisition signal substantially independently of allocation of the memory by the host processor.

81. A system according to claim 64, wherein said memory means comprises a data FIFO register, wherein said means for transferring transfers said image into said register.

82. A system according to claim 81, wherein said transfer of data from said data FIFO register is a direct memory address transfer, thereby substantially reducing the number of times the system interrupts the host processor.

83. A system according to claim 64, further comprising pre-processing means separate from the host processor for receiving said image data and for at least partially processing said data without interrupting said host processor.

84. A system according to claim 64, wherein said means for interrupting is coupled to said data FIFO register and to said image acquisition means for interrupting said acquisition of said image when said data FIFO register is full, thereby permitting reliable transfer of data corresponding to said image.

85. A system according to claim 64, wherein said means for transferring is adapted for immediately and temporarily interrupting said acquisition of said image.

86. An image acquisition system for connection to a machine vision system for acquiring an image of an object, said system having a host processor and comprising:

image acquisition means for acquiring said image of the object, said image acquisition means including photo-sensitive means for acquiring said image in response to an acquisition signal containing selected image acquisition parameters, and programmable control means in circuit with said photo-sensitive means for generating said acquisition signal and for programmably altering during acquisition of said image said selected image acquisition parameters, memory means for storing at least a portion of said image, said memory means including a data FIFO register for accepting an image from said image acquisition means, and memory address transfer means for transferring said image stored in said data FIFO register directly to an address in the host processor, thereby substantially reducing the number of times the system interrupts the host processor, and transfer means for transferring said image from said image acquisition means to said memory means.

87. The image acquisition system of claim 86, wherein said programmable control means includes a programmable imager controller circuit operating at a driving frequency, said programmable imager controller circuit being adapted to be programmed with said image acquisition parameters and having means for automatically changing said driving frequency during acquisition of said image.

88. The image acquisition system of claim 86, wherein said memory means comprises one or more vertical registers coupled to said photo-sensitive means for storing optical energy representative of said acquired image, and one or more horizontal registers positioned to receive at least a portion of said optical energy stored in said vertical register.

89. The image acquisition system of claim 88, wherein said photo-sensitive means is adapted to acquire a region of interest corresponding to at least a portion of said image, further comprising second means for transferring a portion of said optical energy corresponding to a portion of said region of interest from said vertical register to said horizontal register, and disabling means for disabling transfer of optical energy from said horizontal energy during said transfer of optical energy from said vertical register into said horizontal register, whereby said optical energy corresponding to a portion of said region of interest is rapidly transferred from said vertical register to said horizontal register without actively removing said transferred energy from said horizontal register.

90. The image acquisition system of claim 89, wherein said photo-sensitive means is adapted to acquire a region of interest corresponding to at least a portion of said image, further comprising second means for transferring a portion of said energy stored in said vertical register corresponding to a portion of said region of interest to said horizontal register, enabling means for enabling transfer of optical energy stored in said horizontal register therefrom, and disabling means for disabling transfer of optical energy from said vertical register into said horizontal register during said transfer of optical energy out of said horizontal register.

91. The image acquisition system of claim 86, further comprising second transfer means for transferring said image data accumulated in said data FIFO register to the host processor.

92. The image acquisition system of claim 86, further comprising pre-processing means separate from the host processor for receiving said image data and for at least partially processing said data without interrupting said host processor.

93. The image acquisition system of claim 86, further comprising interrupt means coupled to said data FIFO register and to said image acquisition means for interrupting said acquisition of said image when said data FIFO register is full, thereby permitting reliable transfer of data corresponding to said image.

94. The image acquisition system of claim 93, wherein said interrupt means includes means for interrupting said acquisition of said image between lines corresponding to said image.

95. The image acquisition system of claim 93, wherein said interrupt means includes means for immediately and temporarily interrupting said acquisition of said image.

96. The image acquisition system of claim 86, wherein said image acquired by said image acquisition means includes a plurality of pixels, further comprising pixel correction means in circuit with said image acquisition means for correcting said pixels prior to transfer to said memory means.

97. The image acquisition system of claim 96, wherein said pixel correction means comprises second memory means for storing a plurality of pre-determined pixel correction values corresponding to each pixel of said image, and multiplier means for multiplying each pixel of said image by said corresponding pixel correction value, thereby forming a corrected pixel.

98. The image acquisition system of claim 96, wherein said pixel correction means is separate from the host processor and performs said pixel correction in real time.

\* \* \* \* \*